(12) United States Patent
Alisawi et al.

(10) Patent No.: US 9,603,049 B2
(45) Date of Patent: Mar. 21, 2017

(54) EXTENDING DELAY TOLERANCE OF MOBILE APPLICATIONS FOR OPTIMIZING MOBILE TRAFFIC MANAGEMENT

(71) Applicant: Seven Networks, LLC, Marshall, TX (US)

(72) Inventors: Rami Alisawi, Kerava (FI); Suresh Srinivasan, Foster City, CA (US); Ari Backholm, Los Altos, CA (US); Yuan Kang Lee, San Diego, CA (US); Chaitali Sengupta, Richardson, TX (US); Tejas Jukar, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 14/147,468

(22) Filed: Jan. 3, 2014

(65) Prior Publication Data

US 2015/0023162 A1    Jan. 22, 2015

Related U.S. Application Data

(63) Continuation of application No. 14/147,434, filed on Jan. 3, 2014.

(Continued)

(51) Int. Cl.
*H04W 28/02* (2009.01)
*H04W 76/02* (2009.01)
(Continued)

(52) U.S. Cl.
CPC ..... *H04W 28/0289* (2013.01); *H04L 47/2475* (2013.01); *H04L 67/322* (2013.01);
(Continued)

(58) Field of Classification Search
None
See application file for complete search history.

(56) References Cited

U.S. PATENT DOCUMENTS

| 6,408,007 | B1 | 6/2002 | Park |
| 7,260,115 | B1 | 8/2007 | DeFord |

(Continued)

FOREIGN PATENT DOCUMENTS

| EP | 1771033 A2 | 4/2007 |
| WO | 2012128792 A1 | 9/2012 |

OTHER PUBLICATIONS

PCT Search Report mailed Nov. 10, 2014 for PCT Application No. PCT/US2014/047504.

(Continued)

*Primary Examiner* — Sulaiman Nooristany
(74) *Attorney, Agent, or Firm* — NK Patent Law, PLLC

(57) ABSTRACT

Systems and methods for extending delay tolerance of mobile applications to optimize mobile traffic management are disclosed. In a mobile device, network stack timers or protocol stack timers are modified to extend delay tolerance of applications for radio alignment. In an embodiment, tolerance of mobile applications on a mobile device to delay in establishing a connection to a wireless network is extended by an application or a local proxy on a mobile device. Based on the tolerance that is extended, requests intercepted from the mobile applications are aggregated, over a period of time, such that transfer of the requests intercepted during the period of time is delayed. This minimizes the number of times the mobile device connects to the network, reducing the power consumption on the mobile device and unnecessary signaling in the network.

37 Claims, 28 Drawing Sheets

Related U.S. Application Data

(60) Provisional application No. 61/857,152, filed on Jul. 22, 2013.

(51) Int. Cl.
*H04L 29/08* (2006.01)
*H04L 12/859* (2013.01)

(52) U.S. Cl.
CPC ....... *H04W 28/0236* (2013.01); *H04W 76/02* (2013.01); *Y02B 60/50* (2013.01)

(56) References Cited

U.S. PATENT DOCUMENTS

| | | | |
|---|---|---|---|
| 7,391,769 | B2 | 6/2008 | Rajkumar et al. |
| 7,688,857 | B2 | 3/2010 | Jang et al. |
| 7,697,457 | B2 | 4/2010 | Igarashi et al. |
| 7,721,337 | B2 | 5/2010 | Syed |
| 7,974,250 | B2 | 7/2011 | Jang et al. |
| 8,060,154 | B1 | 11/2011 | Bali et al. |
| 8,160,000 | B2 | 4/2012 | Balasubramanian |
| 8,351,997 | B2 | 1/2013 | Liu et al. |
| 8,385,242 | B2 | 2/2013 | Huoviala et al. |
| 8,441,965 | B2 | 5/2013 | Jazra |
| 8,509,193 | B2 | 8/2013 | Hassan et al. |
| 8,750,123 | B1 | 6/2014 | Alsawi |
| 8,750,207 | B2 | 6/2014 | Jeong et al. |
| 8,831,658 | B2 | 9/2014 | Meylan et al. |
| 8,838,086 | B2 | 9/2014 | Giaretta et al. |
| 8,904,206 | B2 | 12/2014 | Black et al. |
| 9,118,575 | B2 | 8/2015 | Granlund et al. |
| 9,178,965 | B2 | 11/2015 | Kondratiev |
| 2003/0152052 | A1 | 8/2003 | Kekki et al. |
| 2004/0128346 | A1 | 7/2004 | Melamed et al. |
| 2005/0221871 | A1 | 10/2005 | Kim |
| 2011/0153728 | A1 | 6/2011 | Einarsson et al. |
| 2011/0194539 | A1* | 8/2011 | Blasinski .......... H04W 72/1252 370/336 |
| 2012/0135726 | A1 | 5/2012 | Luna |
| 2012/0185577 | A1 | 7/2012 | Giaretta et al. |
| 2012/0185597 | A1 | 7/2012 | Luna |
| 2012/0221697 | A1 | 8/2012 | Sainio et al. |
| 2012/0270538 | A1 | 10/2012 | Meylan |
| 2013/0012180 | A1 | 1/2013 | Backholm |
| 2013/0017804 | A1 | 1/2013 | Jun et al. |
| 2013/0163431 | A1* | 6/2013 | Backholm ......... H04W 28/0273 370/235 |

OTHER PUBLICATIONS

Final Office Action mailed Mar. 13, 2015 for U.S. Appl. No. 13/912,067.
Office Action mailed Sep. 10, 2014 for U.S. Appl. No. 14/147,434.
Final Office Action mailed Feb. 11, 2015 for U.S. Appl. No. 14/147,434.
Non-final rejection mailed Jul. 15, 2015 for U.S. Appl. No. 14/147,434.
WIPO, International Preliminary Report on Patentability for PCT patent application PCT/US2014/047504, Jan. 26, 2016.
USPTO, Notice of Allowance for U.S. Appl. No. 13/956,174, mailed on Feb. 17, 2016.
USPTO, supplemental Notice of Allowance for U.S. Appl. No. 13/956,174, mailed on Feb. 25, 2016.
USPTO, Non-Final Rejection for U.S. Appl. No. 14/468,032, mailed on Feb. 4, 2016.
USPTO, Non-Final Rejection for U.S. Appl. No. 14/467,951, mailed on Jan. 26, 2016.
USPTO, Final Rejection for U.S. Appl. No. 14/468,032, mailed on May 26, 2016.
USPTO, Final Rejection for U.S. Appl. No. 14/467,951, mailed on May 27, 2016.
R. Kravets et al.: "Application-driven power management for mobile communication", Wireless Networks 6 (2000) 263-277.
USPTO non-Final Office Action mailed Oct. 26, 2015 for U.S. Appl. No. 13/956,174 and Notice of References Cited.
USPTO, Non-Final Rejection for U.S. Appl. No. 14/468,032, Feb. 4, 2016.
USPTO, Non-Final Rejection for U.S. Appl. No. 14/467,951, Jan. 26, 2016.
USPTO, Non-Final Rejection for U.S. Appl. No. 14/147,434, mailed on Jul. 11, 2016.

* cited by examiner

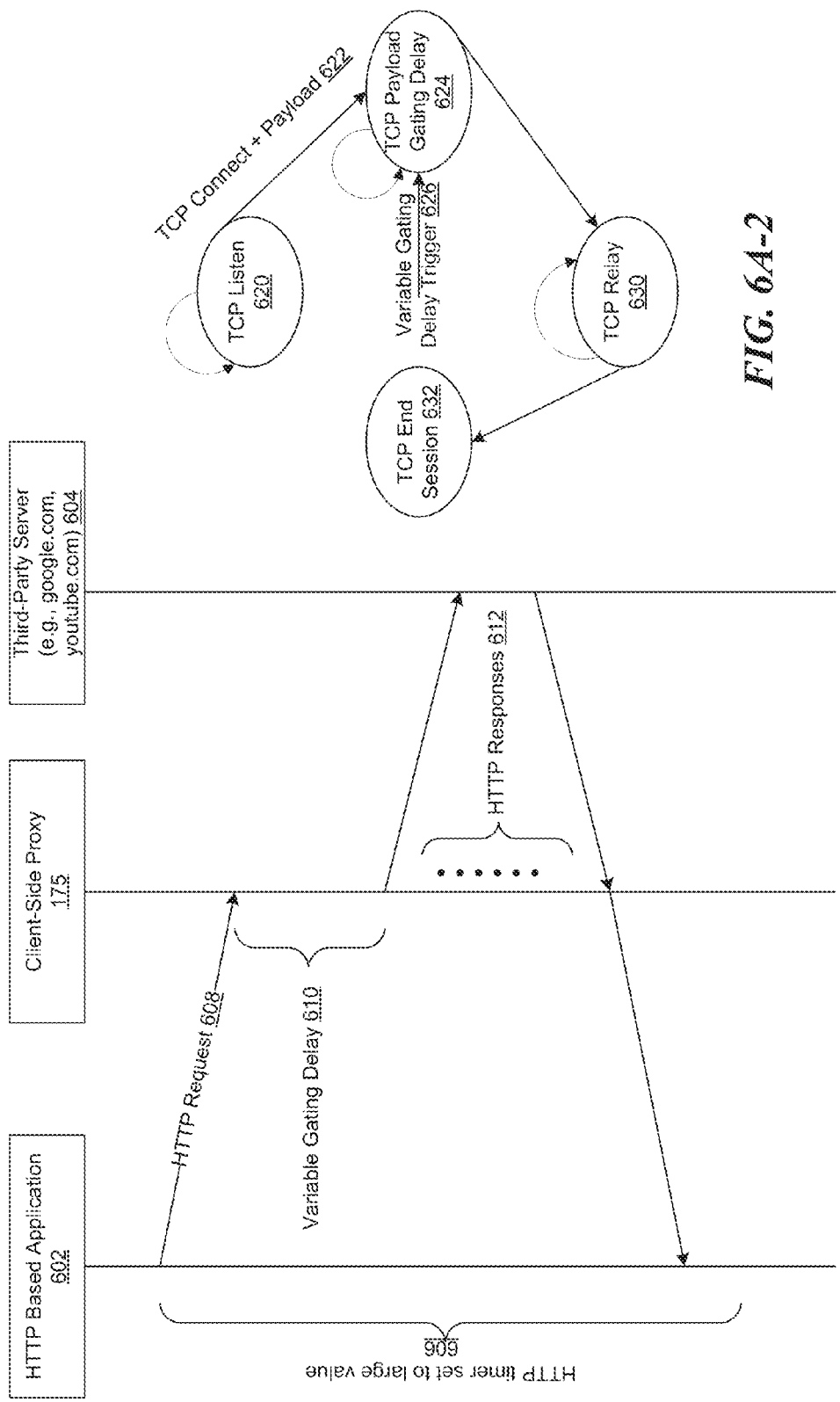

| Traffic Category/Application Category 900 ||
|---|---|
| Interactive traffic | Background traffic |
| User waiting for response | User not waiting for response |
| Application in foreground | Application in background |
| Backlight on | Backlight off |

*FIG. 9*

| Content Category 1000 ||
|---|---|
| High priority | Low priority |
| Time critical | Non-time critical |

*FIG. 10*

EXTENDING DELAY TOLERANCE OF MOBILE APPLICATIONS FOR OPTIMIZING MOBILE TRAFFIC MANAGEMENT

CROSS-REFERENCE TO RELATED APPLICATIONS

This application is a continuation of U.S. patent application Ser. No. 14/147,434, filed on Jan. 3, 2014, entitled "MODIFYING SYSTEM TIMERS FOR OPTIMIZING MOBILE TRAFFIC MANAGEMENT"which claims priority to and benefit from U.S. Provisional Patent Application Ser. No. 61/857,152, filed on Jul. 22, 2013, entitled "MODIFYING SYSTEM TIMERS FOR OPTIMIZING MOBILE TRAFFIC MANAGEMENT"and is related to U.S. patent application Ser. No. 14/049,105, filed on Oct. 8, 2013, entitled "A PROXY SERVER ASSOCIATED WITH A MOBILE CARRIER FOR ENHANCING MOBILE TRAFFIC MANAGEMENT IN A MOBILE NETWORK"and U.S. patent application Ser. No. 14/050,211, filed on Oct. 9, 2013, entitled "SYSTEMS AND METHODS FOR ENHANCING MOBILE TRAFFIC MANAGEMENT AT A PROXY SERVER ASSOCIATED WITH OR RESIDING ON A MOBILE CARRIER FOR ALIGNING TRAFFIC IN THE MOBILE NETWORK". The content of each of the aforementioned applications is herein expressly incorporated by reference in its entirety.

BACKGROUND

Applications such as FACEBOOK, TWITTER, ACCU-WEATHER, CNN, etc., on mobile devices such as smart phones and tablets periodically access the mobile network to check for updates, upload data, etc. The applications, in the process of periodically connecting to and disconnecting from the network, exchange several messages (e.g., radio resource control or RRC messages) with components in the mobile network. These messages contribute to signaling in the mobile network. With increased use of smart phones and data-driven applications, the mobile network can be overloaded with signaling from mobile devices, resulting in mobile network congestion and degradation of the performance of mobile data sessions.

BRIEF DESCRIPTION OF THE DRAWINGS

FIG. 1A-2 illustrates a timing diagram depicting manipulation of delay tolerance of applications in a mobile device for radio alignment.

FIG. 1A-3 illustrates a timing diagram depicting bundling of requests and transfer of requests made possible by extending delay tolerance to establishment of a connection to a wireless network to send and/or receive requests and/or responses.

FIG. 1A-4 illustrates a block diagram of an architecture of an example mobile device platform such as the Android platform having components and/or customizations for optimizing mobile traffic management.

FIG. 1A-5 illustrates a block diagram depicting application traffic passing through framework and network stack layers for intelligent gating in a client-side proxy on the mobile device for optimizing mobile traffic management.

FIG. 3 illustrates a block diagram depicting example components in a system timer modification module for optimizing mobile traffic management.

FIG. 4 illustrates a block diagram depicting an example of network-side components in a distributed proxy and cache system, including components for managing incoming traffic from third-party servers to enhance mobile traffic management and resource conservation in a mobile network.

FIGS. 5A-C illustrate logic flow diagrams of example methods for enhancing mobile traffic management and resource conservation in a mobile network.

FIGS. 6A-1 and 6A-2 illustrate example sequence diagram and state machine for alignment of HTTP requests from multiple applications for optimizing mobile traffic management.

FIGS. 6B-1 and 6B-2 illustrate example sequence diagram and state machine for alignment of HTTPS and FunXMPP requests from multiple applications for optimizing mobile traffic management.

FIG. 9 illustrates a table showing examples of different traffic or application category types which can be used for enhancing mobile traffic management FIG. 10 depicts a table showing examples of different content category types which can be used enhancing mobile traffic management.

DETAILED DESCRIPTION

Figures 1, 1A:
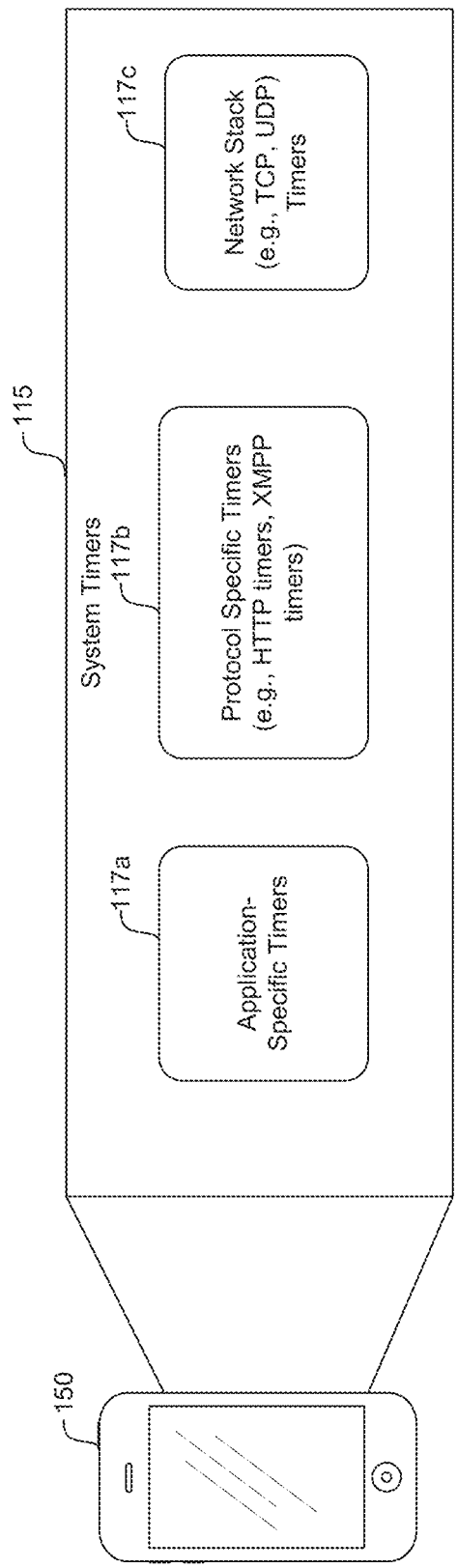
FIG. 1A-1 illustrates a block diagram depicting example system timers for manipulating delay tolerance of applications in a mobile device for optimizing mobile traffic management.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way, Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term, likewise, the disclosure is not limited to various embodiments given in this specification.

As used herein, a "module," "a manager," a "handler," a "detector," an "interface," a "controller," a "normalizer," a "generator," an "invalidator," a "categorizer," a "simulator," an "analyzer," a "tracker" or an "engine" includes a general purpose, dedicated or shared processor and, typically, firmware or software modules that are executed by the processor. Depending upon implementation specific or other considerations, the module, manager, handler, detector, interface, controller, normalizer, generator, invalidator, or engine can be centralized or its functionality distributed. The module, manager, handler, detector, interface, controller, normalizer, generator, invalidator, categorizer, simulator, analyzer, tracker or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, Random Access Memory (RAM), Non-Volatile (NV) storage, to name a few), but may or may not be limited to hardware.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for modifying system timers for optimizing mobile traffic management.

Applications have varying tolerance to delay in receiving responses to transactions (e.g., requests) that they initiate. When a response to a request from an application is delayed, a timer associated with the application may time out. Similarly, protocol layer and network stack layer (e.g., TCP/IP stack) also use timers that may time out due to network delays caused by packet loss, socket-error, server not responding, and the like. Thus, the delay tolerance of an application can depend on any of the application, protocol or network stack specific timers. In general, application-specific timers have the highest precedence, followed by protocol-specific timers (e.g., protocol-specific API (Application Programming interface) timers, framework-specific timers, framework-level timers) and then network stack timers (e.g., TCP stack timers, UDP stack timers).

Application developers typically define application timeouts as specific values, or default values associated with protocol stacks (e.g., HTTP stack) or network stacks (e.g., TCP/UDP stack). These timers generally timeout after a short duration, and can vary across multiple applications. As a result, these timers can prevent optimization and/or management of traffic using various techniques. Example techniques for optimization and/or management of traffic include, but are not limited to: aligning, delaying, clumping (e.g., gating or bundling), blocking or restricting, prioritizing, filtering and/or other methods of alignment.

In some embodiments, the disclosed systems and methods identify tolerance of delay or delay tolerance to keepalives, other non-user-interactive traffic and in some instances, user-interactive traffic (e.g., low priority, non-time critical traffic) for various applications on a mobile device. In further embodiments, the disclosed systems and methods can also identify tolerance of delay to keepalives, other non-user-interactive traffic and in some instances, user-interactive traffic for third-party servers such as application or web servers that provide and/or support services of applications on the mobile device (e.g., application server/content provider 110, ad server 120a, promotional content server 120b, e-coupon server 120c as shown in FIGS. 1B-1C). Note that a third-party server and an application server is used interchangeably throughout the disclosure.

Embodiments of the present disclosure can determine, manipulate and/or optimize delay tolerance for applications to gate multiple outgoing requests associated with multiple applications for a period of time, without causing the applications to timeout. As used herein, outgoing requests or outgoing traffic includes requests or traffic initiated from a mobile device. By way of example, outgoing requests can include requests (e.g., user initiated HTTP or HTTPS requests or background requests) from mobile applications on a mobile device, transport or transmission protocol messages (e.g., SYN, ACK, FIN, RST), and the like. As used herein, incoming traffic includes traffic initiated by one or more application servers associated with one or more mobile applications on a mobile device. By way of example, incoming traffic can include FACEBOOK, CNN, TWITTER, YAHOO NEWS, BBC NEWS, SPOTIFY, ACCUWEATHER, LINE, and other application messages initiated from the server side, i.e., from the application servers.

Some embodiments of the disclosed technology can further align transfer of the gated or otherwise delayed requests to connection or radio events. For example, transfer of the requests that are gated or delayed can occur when a radio on the mobile device is turned on (e.g., connected, activated, powered on), promoted or otherwise changed to a different power state or mode. For example, in 3G network, radio state promotion includes radio state change from idle to CELL_DCH or from a low power state (cell_FACH state is a low power state with low throughput and power consumption) to high power state (CELL_DCH state is a high power state with high throughput and power consumption). Similarly in LTE (Long Term Evolution) network, a radio state promotion includes radio state change from idle to connected. Embodiments of the present disclosure can manipulate or optimize the delay tolerance by manipulating or optimizing the highest level independent timer in the protocol stack. In some instances, the highest level independent timer can be an application's own timer (i.e., application-specific timer 117a as shown in FIG. 1A-1). Embodiments of the present disclosure can then identify application-specific delay tolerance or timeout based on connection loss, gate timing, and the like. For example, a local proxy on a mobile device can gradually increase the delay until: an application times out and closes the socket; the application times out and attempts to retry the request; or the application's retry interval becomes longer than a specified threshold, and the like. The disclosed systems and methods can then use the determined delay tolerance for aligning outgoing requests, e.g., with radio events.

Some applications rely on framework-specific timers or protocol-specific API timers (i.e., protocol-specific timer 117b as shown in FIG. 1A-1). Embodiments of the present disclosure include framework wrappers, or other components in the operating system or integrable with the operating system, that can modify the protocol-specific API timeouts to a fairly large or infinite value to prevent applications that rely on such protocol-level timers from timing out. The disclosed systems and methods can then utilize the enhanced delay tolerance to intercept outgoing requests (e.g., from one or more applications) and bundle (e.g., aggregate, accumulate or batch) them together for transfer to optimize the frequency with which a mobile device needs to establish a connection and/or optimize the amount of data being sent per connection session. This results in reduction in signaling, increased data transfer efficiency and reduction in mobile device power consumption.

Some applications can use network stacks such as the TCP stack directly and rely on the TCP stack timers (i.e., network stack timer 117c as shown in FIG. 1A-1). When a TCP socket is being established, an application developer can set how long the application is allowed to wait for the socket to be established. If the socket is not established within the specified time (e.g., defined by connect timeout), an error or timeout exception (e.g., an event that changes the normal course of operation or requires special processing) is thrown (e.g., raised, generated or triggered). The TCP stack can handle or resolve the timeout exception in a number of ways. For example, the TCP stack can retry a number of times to attempt to establish the socket, without the application being aware (i.e., in a manner that is transparent to the application).

Embodiments of the present disclosure can include a framework wrapper and/or a component in the operating system or integrable with the operating system that can overwrite the connect timeout value for the application to allow TCP stack parameters to be applied. TCP stack parameters are typically larger than application timeouts, and can thus increase the delay tolerance for establishing new sockets. Similarly, if or when a TCP socket is already established, a timeout exception can occur if an application does not receive a response from a server (e.g., application server associated with the application) within a period of time (e.g., usually a few seconds, defined by a read timeout). The application can then retry a number of times using its own retry mechanism or other exception handling mechanisms. Embodiments of the present disclosure can further include a framework wrapper or a component in the operating system or integrable with a mobile operating system that can overwrite the read timeout value to prevent the socket from timing out, and thus increase the delay tolerance for reading sockets.

In some embodiments, the disclosed systems and methods can use a pseudo interface where data packets are routed so that the kernel never sends a reset signal to the sockets when the radio of a mobile device is turned off or powered down. Some or all of the TCP connections can be routed through a distributed proxy comprising a proxy server 125, a local proxy 175 and/or a network-side proxy 114 as shown in FIGS. 1C-1E. The distributed proxy can delay the socket connection to third-party application servers (e.g., application servers/content servers 110, ad server 120a, promotion content server 120b, e-coupon server 120c as shown in FIGS. 1B-1C) and TCP read timeouts in the distributed proxy for a long period of time. States of the TCP connections like sync, est, read, write, and/or other states can be maintained in the distributed proxy. The applications, meanwhile, remain unaware and can wait for connection without timing out. The local proxy 175 can send acknowledgement packets (ACKs) or other cached messages to the applications, without sending the actual queries from the applications to the network. Various implementations of the disclosed systems and methods will now be described.

FIG. 1A-1 is a block diagram illustrating example system timers 115 in a mobile device 150. System timers 115 can include application-specific timers 117a, protocol-specific timers 117b (or protocol-specific API timers) and/or network stack timers 117c. Protocol-specific timers 117b include timers for application protocols such as HTTP (Hyper Text Transfer Protocol), HTTPS (Hyper Text Transfer Protocol Secure), XMPP (Extensible Messaging and Presence Protocol), FunXMPP (a customized version of XMPP), SMTP (Simple Mail Transfer Protocol) and the like, including those defined in RFCs and proprietary protocols. For example, some applications such as browsers and other image loading applications (e.g., YouTube) are HTTP-based and utilize timers specific to the HTTP protocol. Similarly, other applications may be based on customized or proprietary protocols (e.g., HTTPS and FunXMPP protocols) and as such rely on timers associated with the customized or proprietary protocols. Example protocol-specific API timeouts in the Android framework that can be modified or overwritten include setConnectTimeout, setConnectionTimeout, setSoTimeout, setReadTimeout, and the like. Network stack timers 117c are associated with network stacks such as the TCP stack, UDP stack, and the like. Example TCP timeouts that can be modified include ReadTimeout and ConnectTimeout.

Figures 1, 1A, 2:
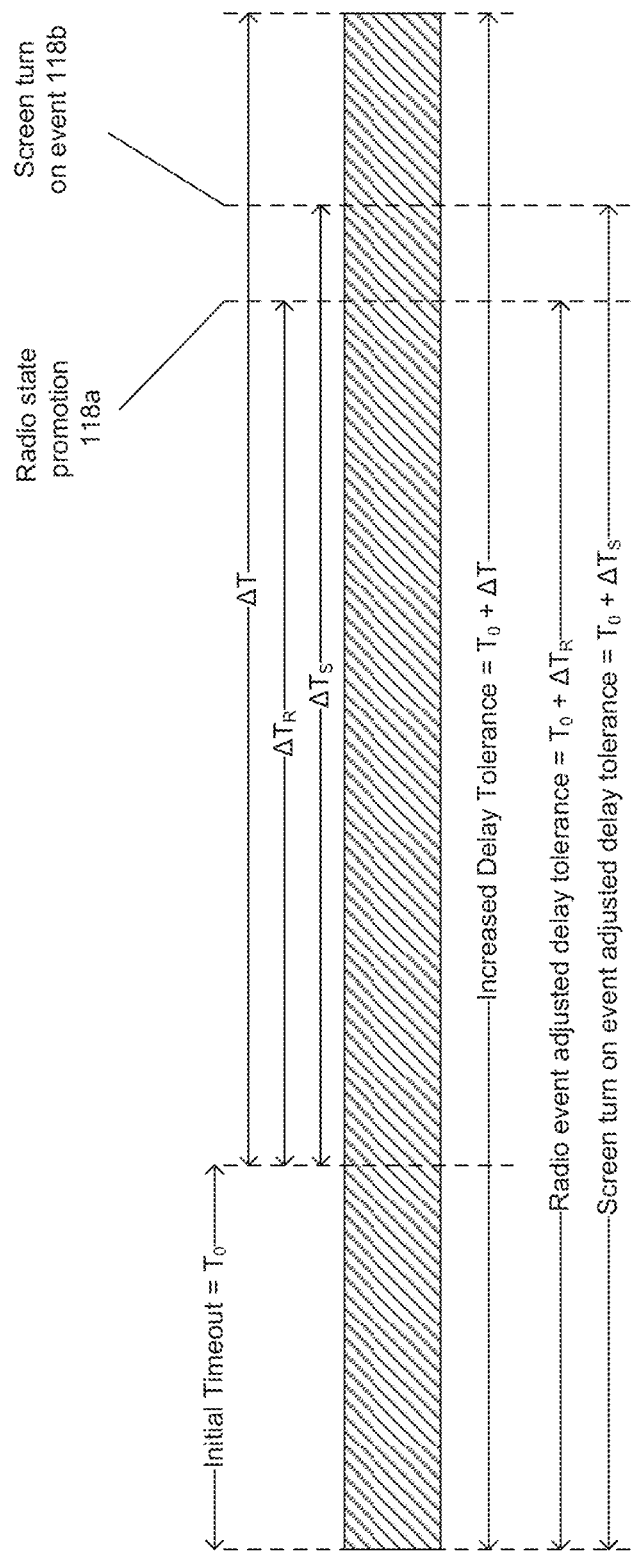

FIG. 1A-2 is a diagram illustrating manipulation of delay tolerance of applications for radio alignment. As illustrated, an application has an initial timeout (delay tolerance) of $T_0$. The application, protocol and/or TCP stack timers can be modified using various methods to extend the delay tolerance of the application from $T_0$ to a maximum or desired value of $T_0+\Delta T$. In some embodiments, the amount by which requests from an application or response to an application can be delayed may depend on various factors. For example, when the radio is turned on or promoted to a high power state at 118a, the requests/responses can be delayed for time $T_0+\Delta T_R$, at which time any requests pending transfer are transferred to the respective third-party servers using the established radio link or connection. Using the same radio link, any requests/responses to be received by the mobile device can also be received. By way of another example, when a screen turn on event 118b is detected, requests from the application can be delayed for time $T_0+\Delta T_S$, at which time the screen turn on event can cause a radio link to be established, and any requests pending transfer can be transferred to the respective application servers using the established radio link. In some embodiments, other events such as detection of user interactive traffic or high priority traffic can also cause the amount of time requests/responses are delayed to be adjusted.

FIG. 1A-3 illustrates a timing diagram depicting bundling of requests and transfer of requests facilitated by extending delay tolerance of applications to establishment of a connection to a wireless network to send and/or receive requests and/or responses. As illustrated, a first time period $T_{STOP}$ can be configured based on the extended delay tolerance to periodically intercept, aggregate and delay requests and prevent those requests from causing a radio connection to be established to the network. Further a second time period $T_{GO}$ can be configured to allow accumulated requests to periodically go out to their respective destinations, to allow applications to receive their updates or other pushed content. When certain events cause a radio on the mobile device to be promoted to a connected or high power state, the requests can be aggregated for a shorter duration than $T_{STOP}$ or transfer of requests can occur for a longer duration than $T_{GO}$. For example, when a screen of the mobile device turns on at 111a, the radio is powered up and the aggregation period is cut short by time $T_1$. The aggregated requests are then transferred using the established connection. If the radio remains connected (e.g., user interactive traffic), data transmission can continue to occur for a duration longer than $T_{GO}$. When the screen finally turns off at 111b, the radio is powered down, and the aggregation period begins.

In some embodiments, the time periods $T_{GO}$ and $T_{STOP}$ may be static and can be predefined and/or subsequently configured and reconfigured by a local proxy 175, a proxy server 125 or a carrier-side proxy server 114 (e.g., network-side proxy, a proxy server residing in or associated with a mobile carrier or operator), as shown in FIGS. 1C-1E. Alternately, these time periods may be determined at run time, and may be dependent on policy, device state, user behavior and/or other characteristics. For example, if the screen is off, $T_{STOP}$ can be made much larger as allowed by the extended delay tolerance. Similarly, when the screen is off, $T_{STOP}$ can be made smaller than $T_{STOP}$ when the screen is off to, for example, minimize impact on user experience. In some embodiments, when the screen is on, the traffic management can be temporarily suspended. Thus, manipulation of the delay tolerance of applications allows requests to be bundled for bulk or batch transfer using a single connection, which reduces the number of radio resource control (RRC) messages exchanged between the mobile device and one or more base stations. This results in significant reduction of signaling in the mobile network. Further, as the mobile device spends more time in the disconnected or idle state (or low power state) aggregating requests, and there are fewer radio state transitions overall, power consumption on the mobile device is also reduced.

FIG. 1A-4 is a block diagram illustrating an architecture of an example mobile device platform such as the Android platform having components and/or customizations for optimizing mobile traffic management. The Android stack 119 includes an application layer 119a, a framework layer 119c, run time core libraries 119d, other libraries 119f, runtime engine 119e (e.g., Dalvik virtual machine) and a kernel 119g. The application layer 119a includes native or core applications (e.g., maps, browsers, camera, alarm, media player, clock, voice dial, contacts, calculator) as well as any other user installed applications (e.g. LINE, WHATSAPP, VIBER, FACEBOOK, ACCUWEATHER, GOOGLE NOW, GOOGLE+, FACEBOOK, CNN, TWITTER, YAHOO NEWS, BBC NEWS, SPOTIFY, and the like).

The framework layer 119c includes framework application programming interfaces (APIs) that are used by the core applications and other applications to take advantage of the mobile device hardware, access location information, store data in internal or external storage on the mobile device, run background services, add notifications, and the like. In some embodiments, framework wrappers/plugins 119b can be deployed to the mobile device platform stack 119 as an add-on or as a firmware update. In one example implementation, the framework wrappers 119b include a module or component that can monitor and/or select certain data streams (e.g., HTTP based data stream) and modify the protocol specific timeouts to extend the delay tolerance of associated applications for aligning of requests/responses, without the applications being aware of the modification.

The core and other libraries 119d and 119e can be used by various components of the mobile device platform and provide many of the functionalities. Example core libraries include libraries for supporting playback and recording of audio/video and images, managing access to the display subsystem, web browser engine libraries, libraries for bitmap and vector font rendering, SQLite library, system C library, and the like. Each mobile application can run in its own process with its own instance of the Virtual Machine 119e such as the Dalvik VM.

The OS or the kernel 119g (e.g., Linux kernel) acts as an abstraction layer between the hardware and the rest of the stack including the application layer 119a, the framework layer 119c, framework wrappers/plugins 119b, the libraries 119d/119f, and the virtual machine 119e. The kernel supports core system services such as memory and process management, network stack, driver model, and security. In some embodiments, the kernel 119g includes a module or component for monitoring data streams from applications (e.g., non-user-interactive traffic from certain applications that rely on TCP stack timers, low priority traffic from applications relying on TCP stack timers) and detecting and/or modifying application specific TCP timeouts to prevent timeout exception from being triggered, without the applications being aware of the modification. Such a component may be a part of the stock OS, or may be integrated within the OS by device manufacturers, carriers, and/or end users. In some embodiments, the module or component may be deployed as a customized read only memory (hereinafter "custom ROM") that replaces the firmware on the mobile device or as a firmware update to the OS to provide delay tolerance optimization functionalities.

FIG. 1A-5 is a block diagram illustrating timer modifications at the framework level and/or the network stack level to allow a client-side proxy 175 on a mobile device 150 to align outgoing traffic originating from multiple applications. As illustrated, the kernel 119g includes the network stack such as the TCP stack including sockets 124a and 124b. In some embodiments, the protocol-specific timeouts 122 are modified at the framework layer via framework wrappers 119b, such that the modified timeouts reach the TCP socket 124a. For example, for requests such as HEW requests, that go over TCP, the modified timeouts for the HTTP requests are passed to the underlying TCP socket as TCP timeouts (e.g., connect and read timeouts for the TCP socket). In other embodiments, TCP timeouts 123 associated with the TCP stack are modified such that the modified TCP timeouts reach the sockets 124a/b. The client side proxy 175 can include software components or agents installed on the mobile device 150 that can operate transparently for end users and applications, and interface with the device's operating system (OS). In some embodiments, the client-side proxy 175 can be partially or wholly external to or independent of the OS of the mobile device 150. In other embodiments, the client-side proxy 175 can be integrated with or be a part of the OS of the mobile device 150. The OS can include any operating system including but not limited to: any previous, current, and/or future versions/releases of, Windows Mobile, iOS, Android, Symbian, Palm OS, Brew MP, Java 2 Micro Edition (J2ME), Blackberry, and the like.

As illustrated, when protocol-specific timeouts are modified, applications 119a that rely on those protocol-specific timeouts can wait for a longer time to receive responses, without generating or raising a timeout exception or error. Similarly, when TCP timeouts are modified, applications 119a that rely on the TCP timeouts can wait for an otherwise longer time to establish new sockets and/or read from established sockets, without generating or raising a timeout exception or error. Outgoing TCP traffic from the applications can be intercepted by the client-side proxy 175, which uses intelligent gating delay to align outgoing traffic from one or more applications. The aligned traffic is then sent over TCP as outgoing traffic 121 to respective third-party application servers (e.g., application servers/content servers 110 as shown in FIGS. 1B-1C).

FIG. 1B illustrates an example diagram of a system where a host server 100 facilitates management of traffic, content caching, and/or resource conservation between client devices 150 (e.g., mobile devices or wireless devices), an application server 110 or content provider, or other servers such as an ad server 120a, promotional content server 120b, or an c-coupon server 120c in a wireless network (or broadband network) for a distributed proxy system for enhancing mobile traffic management in the mobile network and resource conservation.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the client devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

The client devices 150 can include, for example, mobile, hand held or portable devices, wireless devices, or non-portable devices and can be any of but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, wearable devices, mobile-enabled electronic glasses, mobile-enabled electronic watches, wireless-enabled glasses, wireless-enabled watches, wireless electronic glasses, wireless electronic watches, etc. In one embodiment, the client devices 150 for mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the mobile device 150 can observe user activity (for example, by observing user keystrokes, backlight status, or other signals via one or more input mechanisms, etc.) and alter mobile device 150 behaviors. The mobile device 150 can also request the host server 100 to alter the behavior for network resource consumption based on user activity or behavior.

In one embodiment, traffic management for resource conservation is performed using a system distributed between the client device 150 and the network 106/108. The distributed system can include proxy and cache components on the side of the client device 150 and/or the side of the network 106/108.

In another embodiment, the traffic management for resource conservation is performed using a system distributed between the host server 100 and the client device 150. The distributed system can include a proxy server 125 and cache components on the server side 100 and a local proxy and cache components on the device/client side, for example, as shown by the server cache 135 on the server 100 side and the local cache 185 on the client device 150 side.

In yet another embodiment, the traffic management for resource conservation is performed using a system distributed among the host server 100, client device 150 and the network 106/108. The distributed system can include proxy and/or cache components on the server side 100, on the client device 150 side and on the network-side 106/108.

Functions and techniques disclosed for context aware traffic management for resource conservation in networks (e.g., network 106 and/or 108) and devices 150, reside in a distributed proxy and cache system. The proxy and cache system can be distributed between, and reside on, a given client device 150 in part or in whole, the host server 100 in part or in whole and/or the network-side proxy in part or in whole. The distributed proxy and cache system are illustrated with further reference to the example diagram shown in FIG. 1C. Functions and techniques performed by the proxy and cache components in the client device 150 and related components therein are described, respectively, in detail with further reference to the examples of FIGS. 2A-2C. Similarly, functions and techniques performed by the proxy and/or cache components in the network 106 and related components therein are described, respectively, in detail with further reference to the examples of FIG. 3. Functions and techniques performed by the components in the network-side proxy 114 which is a proxy server associated with or residing on a mobile carrier network, mobile operator network or mobile operator server, are described in detail in the examples of FIG. 4. Functions and techniques performed by the proxy server 125 and cache components in the host server 100 and related components are described in detail in the examples of FIGS. 5A-5C.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as Secure Sockets Layer (SSL), or Transport Layer Security (TLS).

In addition, communications can be achieved via one or more networks, such as, but are not limited to, one or more of WiMax, a Local Area Network (LAN), Wireless Local Area Network (WLAN), a Personal Area Network (PAN), a Campus Area Network (CAN), a Metropolitan Area Network (MAN), a Wide Area Network (WAN), a Wireless Wide Area Network (WWAN), or any broadband network, and further enabled with technologies such as, by way of example, Global System for Mobile Communications (GSM), Personal Communications Service (PCS), Bluetooth, Wi-Fi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, Wireless MAN-Advanced Networks, Enhanced Data Rates for GSM Evolution (EDGE), General Packet Radio Service (GPRS), Enhanced GPRS, iBurst, UMTS, HSPDA, HSUPA, HSPA, HSPA+, UMTS-TDD, 1xRTT, EV-DO, messaging protocols such as, TCP/IP, SMS, MMS, Extensible Messaging and Presence Protocol (XMPP), Real Time Messaging Protocol (RTMP), Instant Messaging and Presence Protocol (IMPP), instant messaging, USSD, IRC, or any other wireless data networks, broadband networks, or messaging protocols.

FIG. 1C illustrates an example diagram of a proxy and cache system distributed between the host server 100, operator network 106 and a mobile device 150 which facilitates network traffic management between the mobile device 150, an application server or content provider 110, or other servers such as an ad server 120*a*, promotional content server 120*b*, or an e-coupon server 120*c* for traffic management, resource conservation and content caching. The network-side proxy 114 in the operator network 106 can further enhance mobile traffic management and resource conservation in a mobile network.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120*a*, promotional content servers 120*b*, and/or e-Coupon servers 120*c* as application servers or content providers are illustrated by way of example.

The distributed system can also include in one embodiment client-side components, including by way of example, but not limitation, a local proxy 175 (e.g., a mobile client on a mobile device) and/or a local cache 185, which can as illustrated reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

The distributed system can further include, in one embodiment, network-side components, including by way of example but not limitation, a network-side proxy 114 (e.g., a component in the operator network) and/or a network-side cache (not shown), which can, as shown, reside in the operator network 106, The network-side proxy 114 may be external to the mobile device 150, the third-party servers (e.g., 110, 120*a*, 120*b*, 120*c*, and the like), and the host server 100. In one embodiment, the network-side proxy 114 may reside in the operator's core network as an inline proxy through which all incoming/outgoing traffic to/from the mobile device is routed. Iii another embodiment, the network-side proxy 114 may reside in the radio access network, and may have knowledge of the radio state of the mobile device from the network, or from real time information provided by the local proxy 175 and/or the proxy server 125 regarding radio state promotions and demotions.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Caching proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or congestion alleviation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIGS. 2A-2C.

The local cache 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can further aggregate reports on detection of congestion from multiple mobile devices to provide reports on congestion distribution and timing patterns and other information to operators of the networks.

In general, the local proxy 175, the proxy server 125 and/or the network-side proxy 114 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router. Similarly, the network-side proxy 114 can be customizable in part on in whole to be network operator specific. For example, traffic management policies for one network operator may be different from policies for another network operator.

In one embodiment, the host server 100 can in some instances, utilize the store and forward functions of a short message service center (SMSC) 112, such as that provided by the network service provider, in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the client device 150, if available, and for subsequent forwarding if the client device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175, the proxy server 125 and/or the network-side proxy 114 can also accumulate background requests and low priority data and send it in batches to avoid the protocol overhead of sending individual data fragments and establishing data connections. The local proxy 175, the network-side proxy 114 and/or the proxy server 125 can also compress or transcode the traffic, reducing the amount of data sent over the network 106 and/or 108. The network-side proxy can further block unnecessary data (e.g., during socket closure) from reaching the mobile device and causing the radio on the mobile device to turn on or be promoted. The network-side proxy can also supply cached responses to third-party servers to keep the servers happy, and prevent them from retrying. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175, the network-side proxy 114 and the proxy server 125 can work in conjunction to accumulate background requests and other low priority data and send such data in batches to reduce the number of times and/or length of time when the radio is powered up. The local proxy 175 can synchronize the network use by performing the batched data transfer for all connections simultaneously.

FIG. 1D illustrates an example diagram of the logical architecture of a distributed proxy and cache system which can include components such as a client-side proxy 175, a server-side proxy 125, a network-side proxy 114 and a log storage and processing service 174. Some example components of the distributed proxy and cache system are described as follows:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIGS. 2A-2B.

Network-Side Proxy or proxy server 114: a component in the mobile operator network, carrier network, or mobile operator network server. In some embodiments, the network-side proxy can live on the core network or the radio access network 112. The network-side proxy can interface with mobile devices 150, third-party servers (e.g., application server/content providers 110, caching proxy server 199) and server-side proxy 125. The network-side proxy 114 can be configured as the last node for incoming traffic, before the incoming traffic reaches the radio modem on the mobile device. The network-side proxy 114 is typically compliant with and able to operate with standard or state of the art networking protocols and/or other requirements specific to the network operator. Additional components and features of the network-side proxy 114 are illustrated with further references to the examples of FIG. 4.

The server side proxy 125 can include one or more servers that can interface with third party application servers (which can be proxy 199 or other servers that are not illustrated), the client-side proxy 175 and/or the network-side proxy 114. In general, the server side proxy 125 can be compliant with and is generally able to operate with standard or state of the art networking protocols and/or specifications for interacting with mobile network elements and/or third party servers. Some components and features of the server-side proxy 125 are illustrated with further references to the examples of FIG. 1G and FIGS. 5A-5C.

Log Storage and Processing Service (LSPS) 174: The log storage and processing service, server, system or component 174 can provide reporting and usage analytics services. The LSPS 174 can collect information (e.g., logs) from the client side proxy 175, the network-side proxy 114 and/or the server side proxy 125 and provide the necessary tools for producing reports and usage analytics can used for analyzing traffic and signaling data or behavior across applications, servers, and the like. The client logs (e.g., logs on the client device 150 aggregated by the local proxy 175) are stored in the device until a data channel is activated, and then are transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated may be a server separate from the server-side proxy 125 and/or the host server 100 or it may be a component of the server-side proxy 125 and/or the host server 100, residing partially or wholly therein.

In one implementation, the level of logging e.g., types of data to be logged, and the like) can be specified using configuration settings in the client-side proxy 175, the network-side proxy 114 and/or the server-side proxy 125. Various data relating to bytes and transactions, network connectivity, power, subscriber count, and the like may be logged, and/or processed using default (or another) settings on a periodic (e.g., hourly, daily, and the like) basis.

Bytes and Transactions data may include a number of bytes transacted (both to and from), total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175 the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

FIG. 1E illustrates an example diagram of the logical architecture of a distributed proxy and cache system comprising six sockets distributed over various components that include a client-side proxy 175 in a mobile device 150, a network-side proxy 114 in a mobile carrier or mobile operator network 152, a third-party server 110 and a server-side proxy 125 in a host server (e.g., host server 100) for optimizing mobile traffic management and resource conservation.

The illustrated components can communicate with each other via TCP or other protocols that provide a communication channel between two components. To communicate over TCP, a connection is established between components. Each component can then bind to a socket at its end and can read from and write to the socket bound to the connection. As illustrated, the mobile device 150 includes multiple applications such as application 163 which can establish a communication link with the client-side proxy 175 having a local cache 185. The application 163 can read from or write to the socket S1, while the client-side proxy 175 can read from and write to socket S2 at its end of the connection. The client-side proxy 175 can overwrite or modify timers associated with both sockets S1 and S2 to, for example, delay socket establishment or defer reading from the socket. Thus both sockets S1 and S2 are under the control of the client-side proxy 175.

The client-side proxy 175 on the mobile device can also establish a communication link with the network-side proxy 114 in the carrier or operator network 152. The client-side proxy 175 can read from and write to socket S3 at its end of the connection, while the network-side proxy 114 can read from and write to socket S4 at its end of the connection. Thus the client-side proxy 175 can modify the timers associated with the socket S3, and the network-side proxy 114 can also modify the timers associated with the socket S4.

The network-side proxy 114 in the mobile carrier or mobile operator network can also establish communication links multiple third-party application servers such as the third-party server 110. The third-party server 110 can include, for example, application servers and/or web servers that support various operations of applications installed on the mobile device 150. As illustrated, the socket S5 at one end of the connection can be controlled by the network-side proxy, while the socket S6 at the other end of the connection can be controlled by the third-party server 110.

Typically, third-party servers tend to timeout and close inactive sockets to save resources if they do not hear anything from the client. The third-party server 110 can send a final (FIN) packet to the mobile device 150 to close the socket. If the FIN packet gets lost, the third-party server 110 can keep retrying with increasing backoff algorithm. In some cases, the third party server 110 can also push some data to test the TCP connection. Since the socket S6 is owned and controlled by the third-party server 110, which is independent of the network-side proxy 114 and the client-side proxy 175, only the third-party server 110 can modify the timers and/or other socket behavior. However, the network-side proxy 114 can prevent the third-party server 110 from timing out and/or causing signaling (e.g., sending of FIN packets), by intercepting any unnecessary data from the third-party server 110, and can prevent such unnecessary data from being delivered to the mobile device 150. In some embodiments, the network-side proxy 114 can provide a response (e.g., cached response) to a request from the third-party server to allow the third-party server 110 to close its socket S6 without causing additional signaling or to keep the socket S6 from timing out.

As illustrated, the network-side proxy 114 in the mobile carrier or mobile operator network 152 can also establish a communication link the server-side proxy 125 having a server cache 116. The network-side proxy 114 can control the socket A at its end of the communication link, while the socket B can be controlled by the server-side proxy 125 at its end of the communication link. Similarly, communication links between the server-side proxy 125 and multiple third-party servers such as the third-party server 110 can be established in some embodiments. The socket C on one end of the communication link can be controlled by the server-side proxy 125, while socket D on the other end of the communication link can only be controlled by the third-party server 110. To prevent socket D from timing out or causing additional signaling, the server-side proxy 125 can also intercept traffic from the third-party server 110, and in some cases respond to the traffic using cached response from the server cache 116. Thus, the disclosed technology can control the timeout behavior of sockets S1-S5 using the application, framework and/or network stack level timer modification and manage the behavior of socket S6 through interception of data packets and/or use of cached responses. This allows incoming and outgoing traffic to be managed for signaling optimization and resource conservation.

Figures 1, 1A, 2, 3:
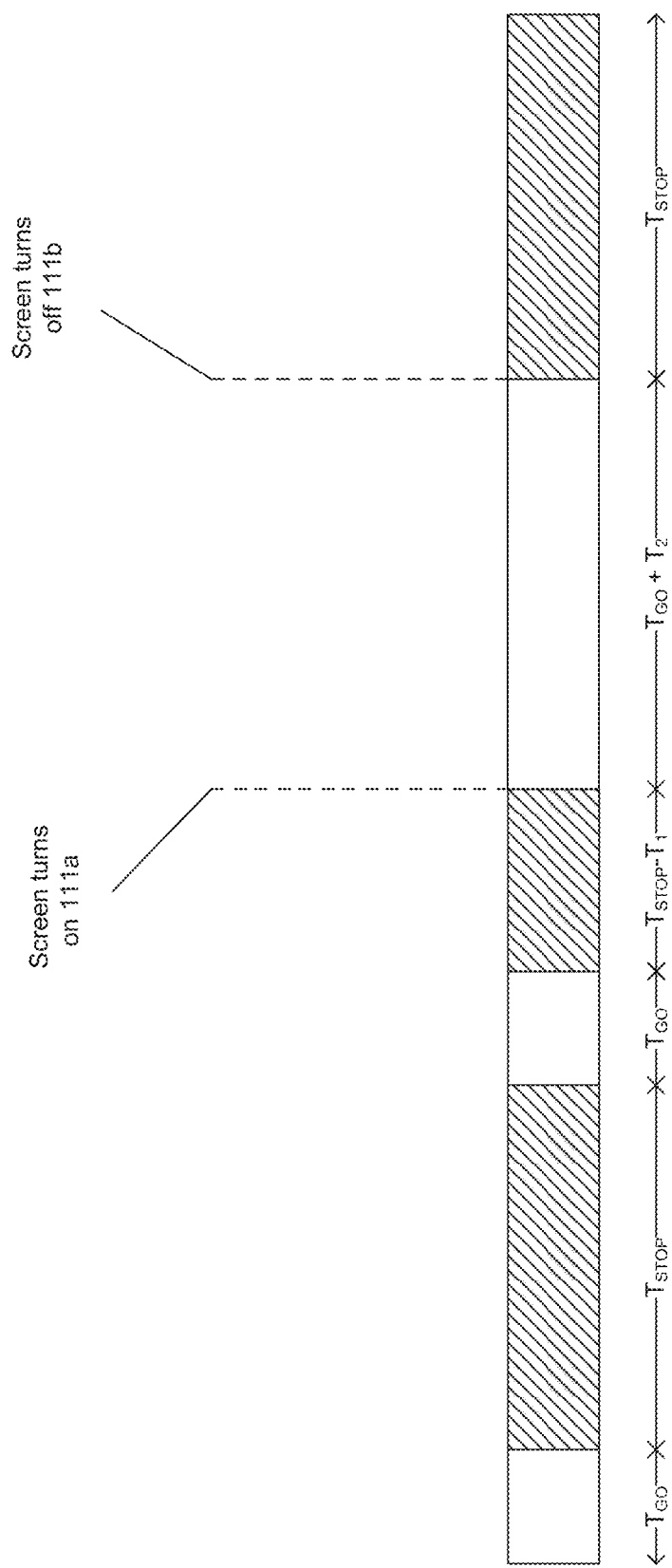
Figures 1, 1A, 2, 3, 4:
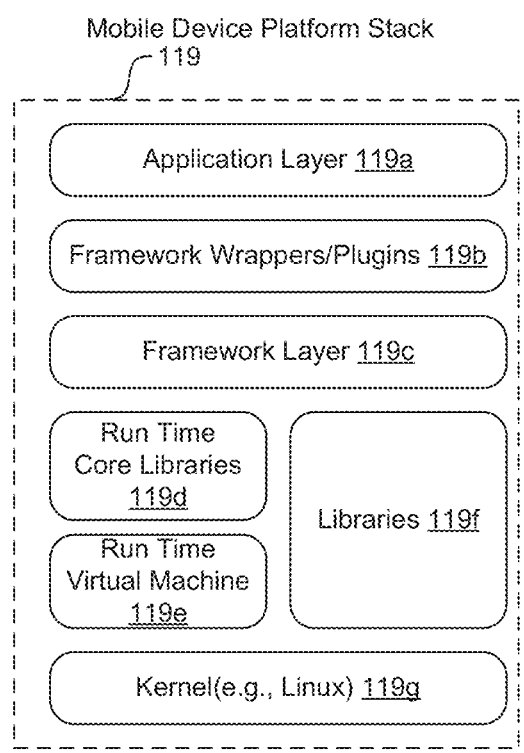
Figures 1, 1A, 2, 3, 4, 5:
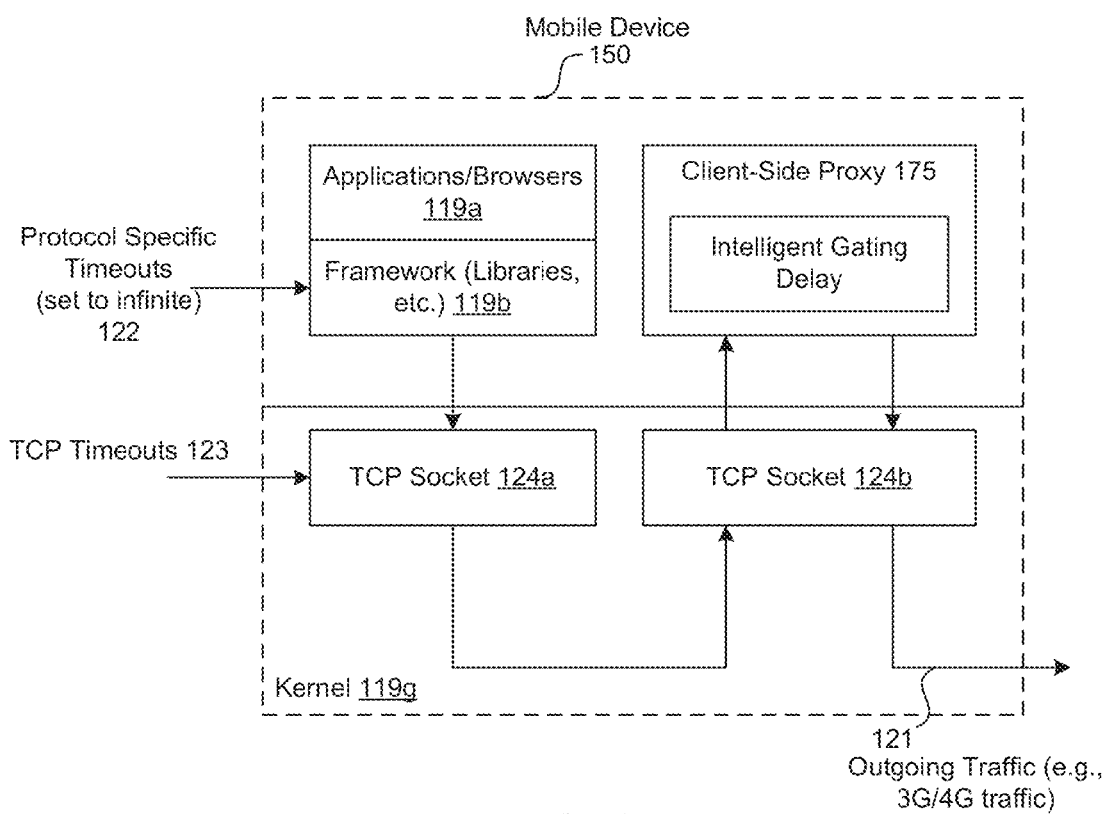
Figure 1B:
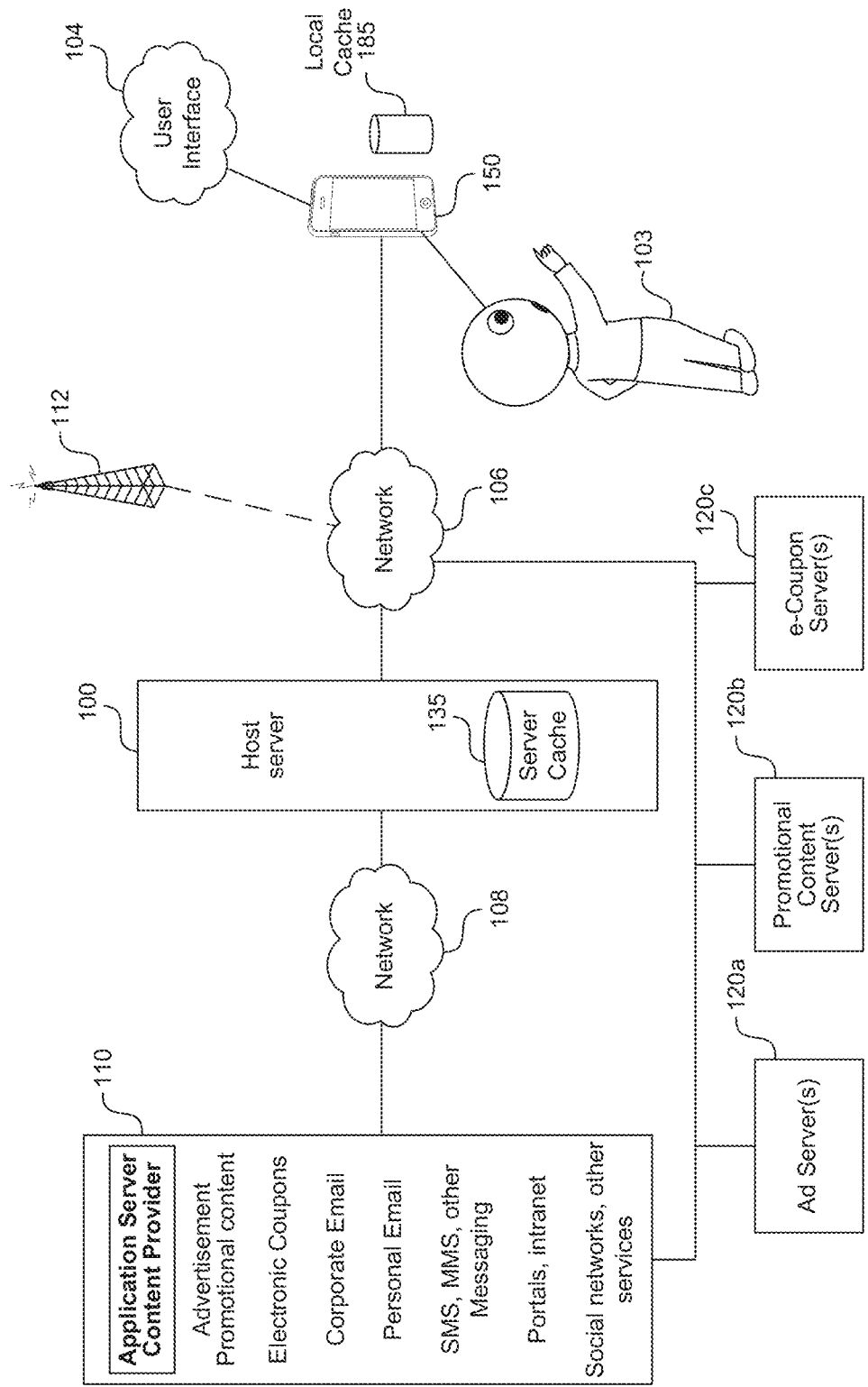
FIG. 1B illustrates an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for a distributed proxy system for enhancing mobile traffic management and resource conservation in the mobile network.
Figure 1C:
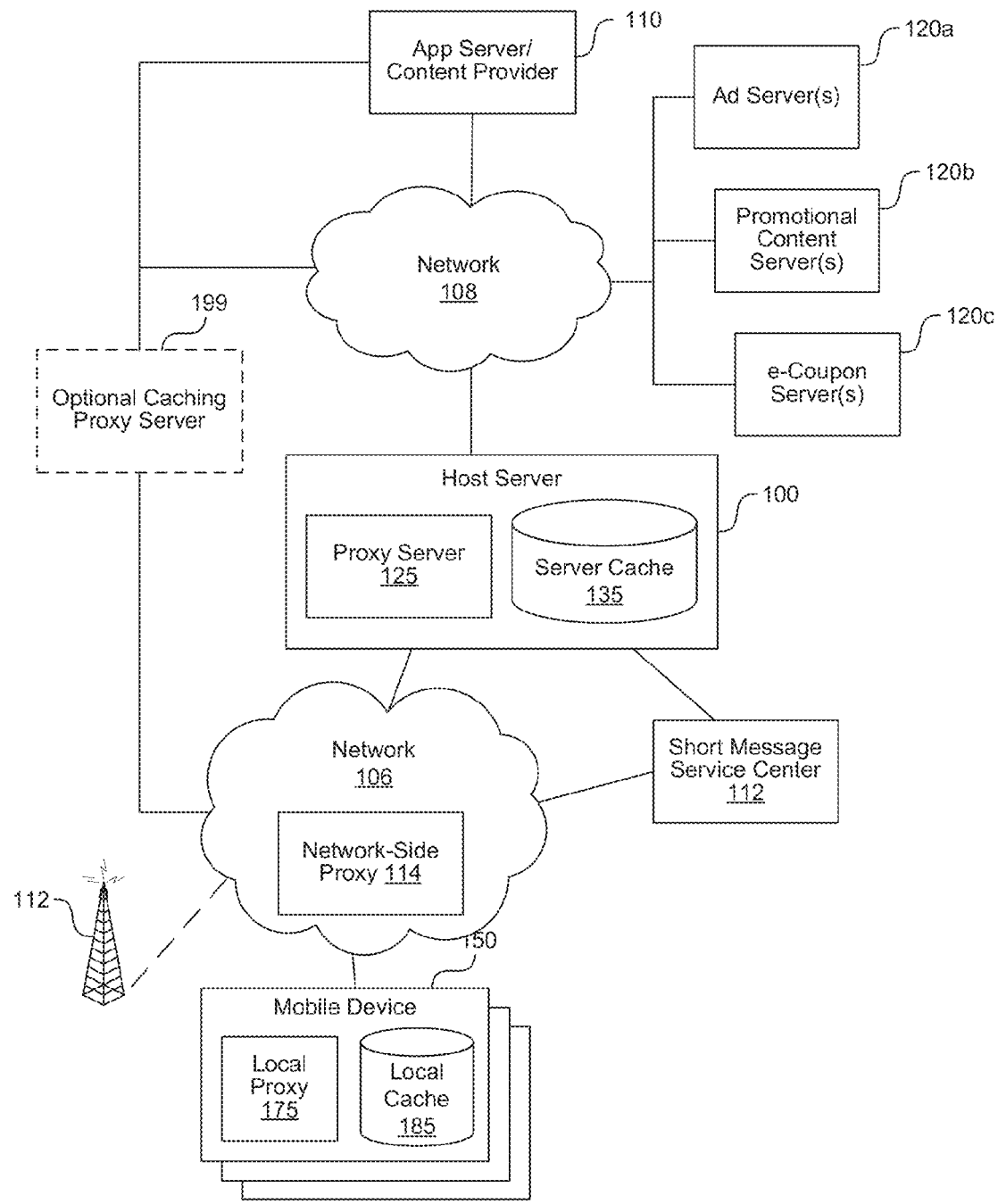
FIG. 1C illustrates an example diagram of a proxy and cache system distributed between the host server, operator network and a mobile device which facilitates network traffic management between the mobile device, an application server or content provider, or other servers such as an ad server, promotional content server, or an e-coupon server for traffic management, resource conservation and content caching. A proxy server (or network-side proxy) in the operator network can further enhance mobile traffic management and resource conservation in a mobile network.
Figure 1D:
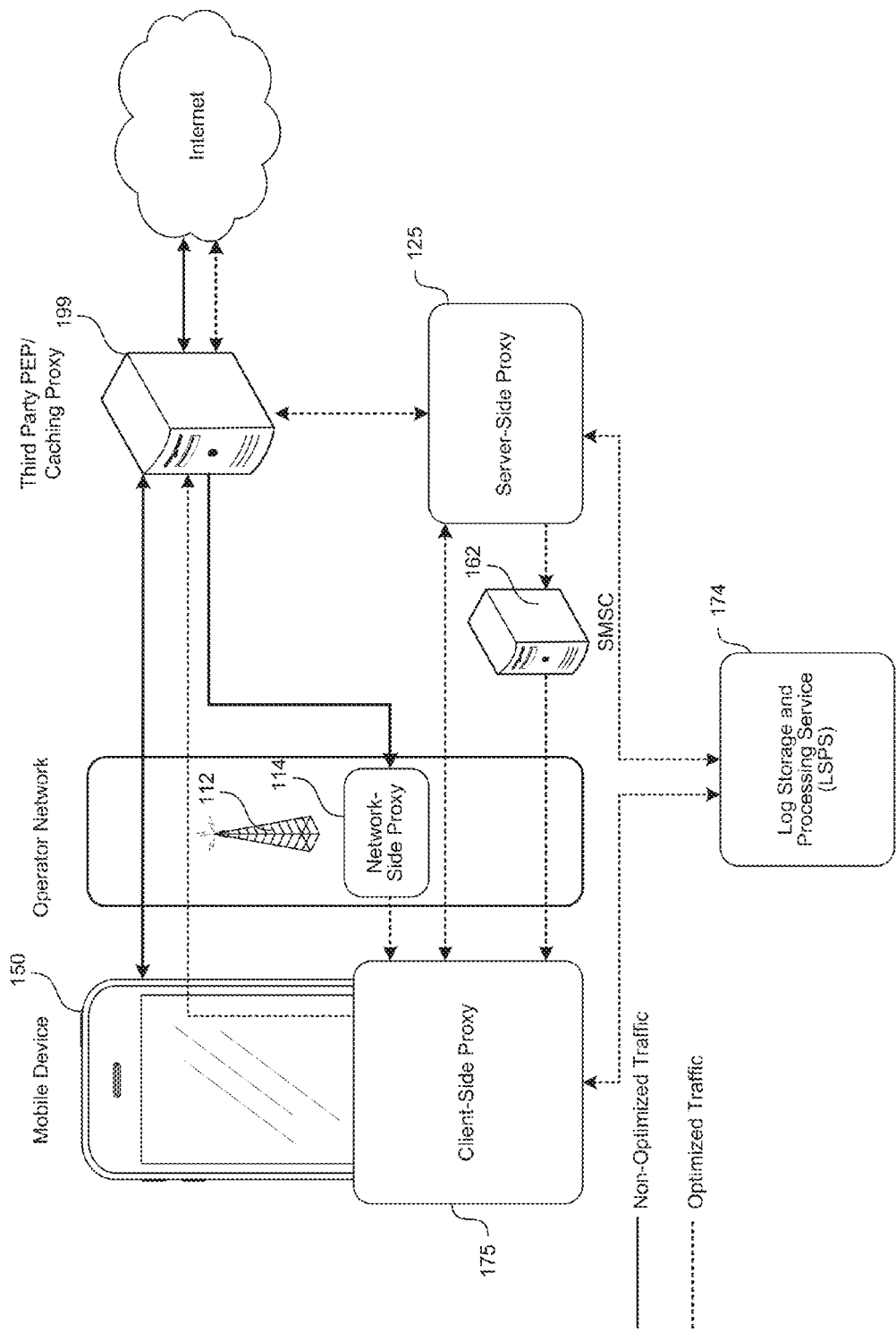
FIG. 1D illustrates an example diagram of the logical architecture of a distributed proxy and cache system, including a client-side proxy, a server-side proxy, a network-side proxy and a log storage and processing service.
Figure 1E:
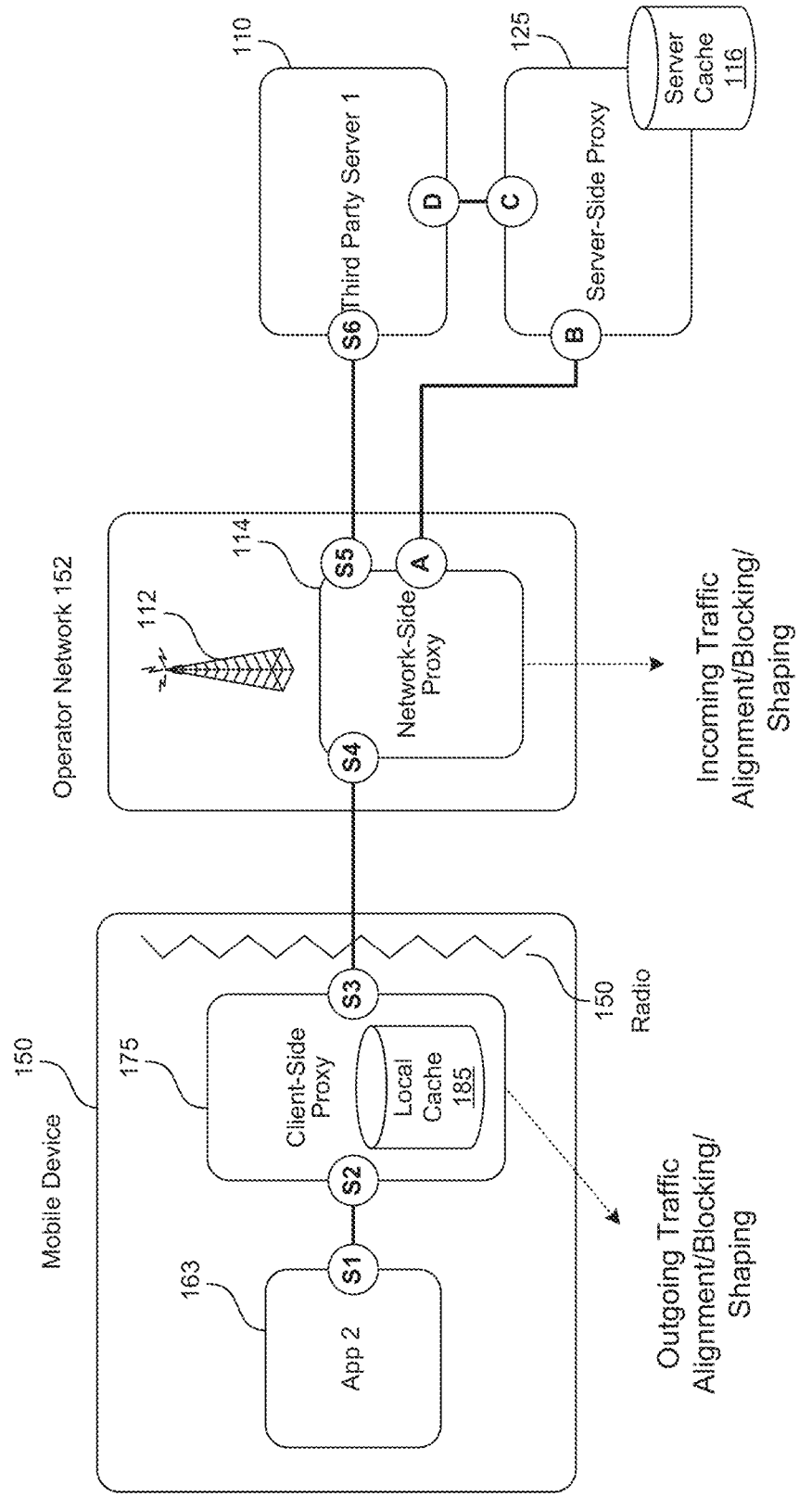
FIG. 1E illustrates an example diagram of the logical architecture of a distributed proxy and cache system comprising six sockets distributed over a client-side proxy, a network-side proxy and a server-side proxy to optimize traffic management and resource conservation in a mobile network.
Figure 1F:
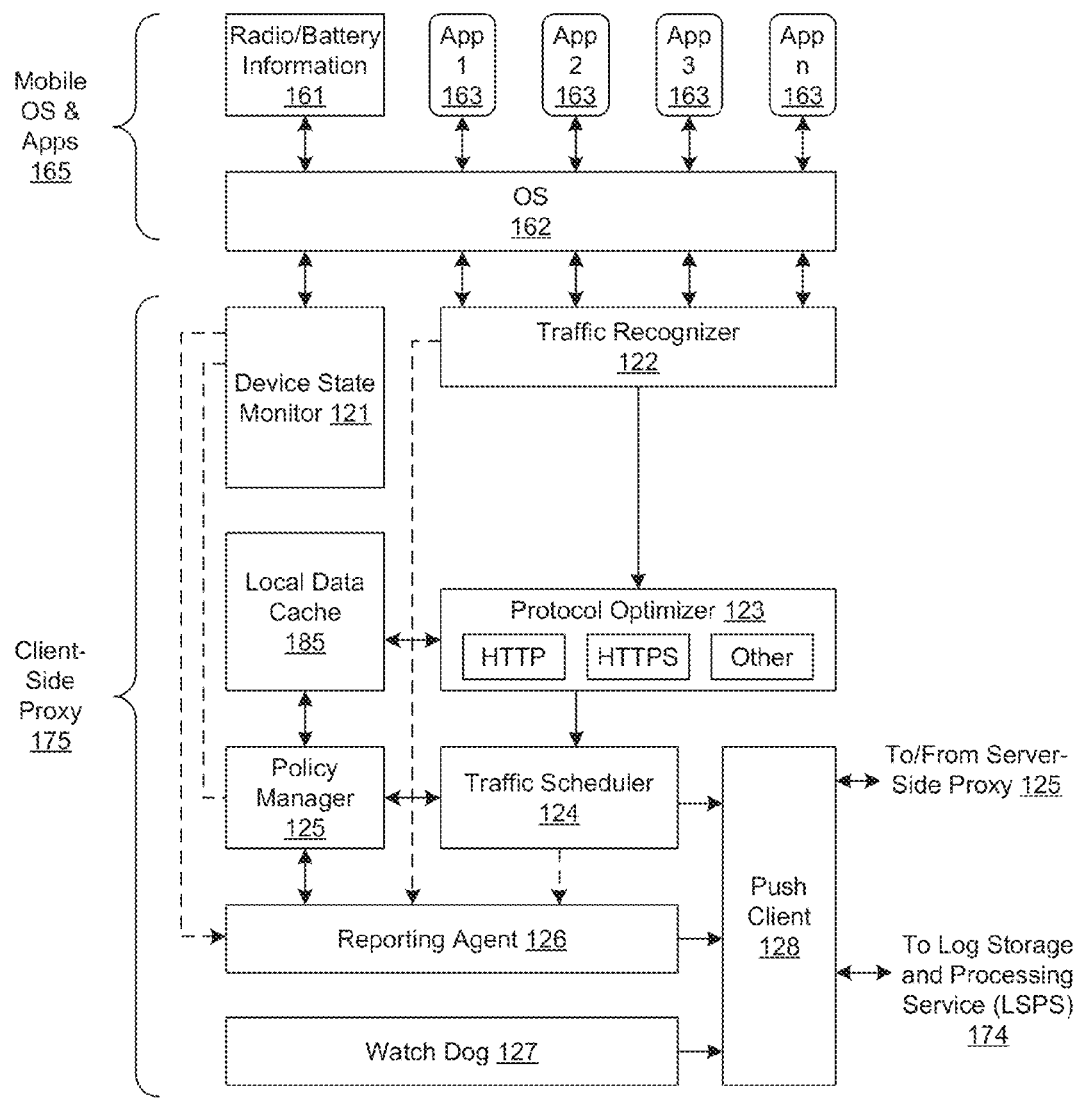
FIG. 1F illustrates an example diagram showing the architecture of client side components in a distributed proxy and cache system.

FIG. 1F illustrates an example diagram showing the architecture of client side components in a distributed proxy and cache system.

The client side proxy 175 can include software components or agents installed on the mobile device that enable traffic optimization and perform the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state, Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent requests from the local cache 185 instead of allowing those requests go over the network to the service provider/application host server. One of its tasks is to eliminate or minimize the need to send requests to the network, positively affecting network congestion and device battery life.

Local Cache 1185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic management and/or optimization and/or reporting policies provisioned by a Policy Management Server (PMS). At the client side proxy 175 first start, traffic management and/or optimization and reporting policies (policy profiles) that is to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a log storage and processing service 176, which may be internal to or external to the server side proxy 125.

Figure 1G:
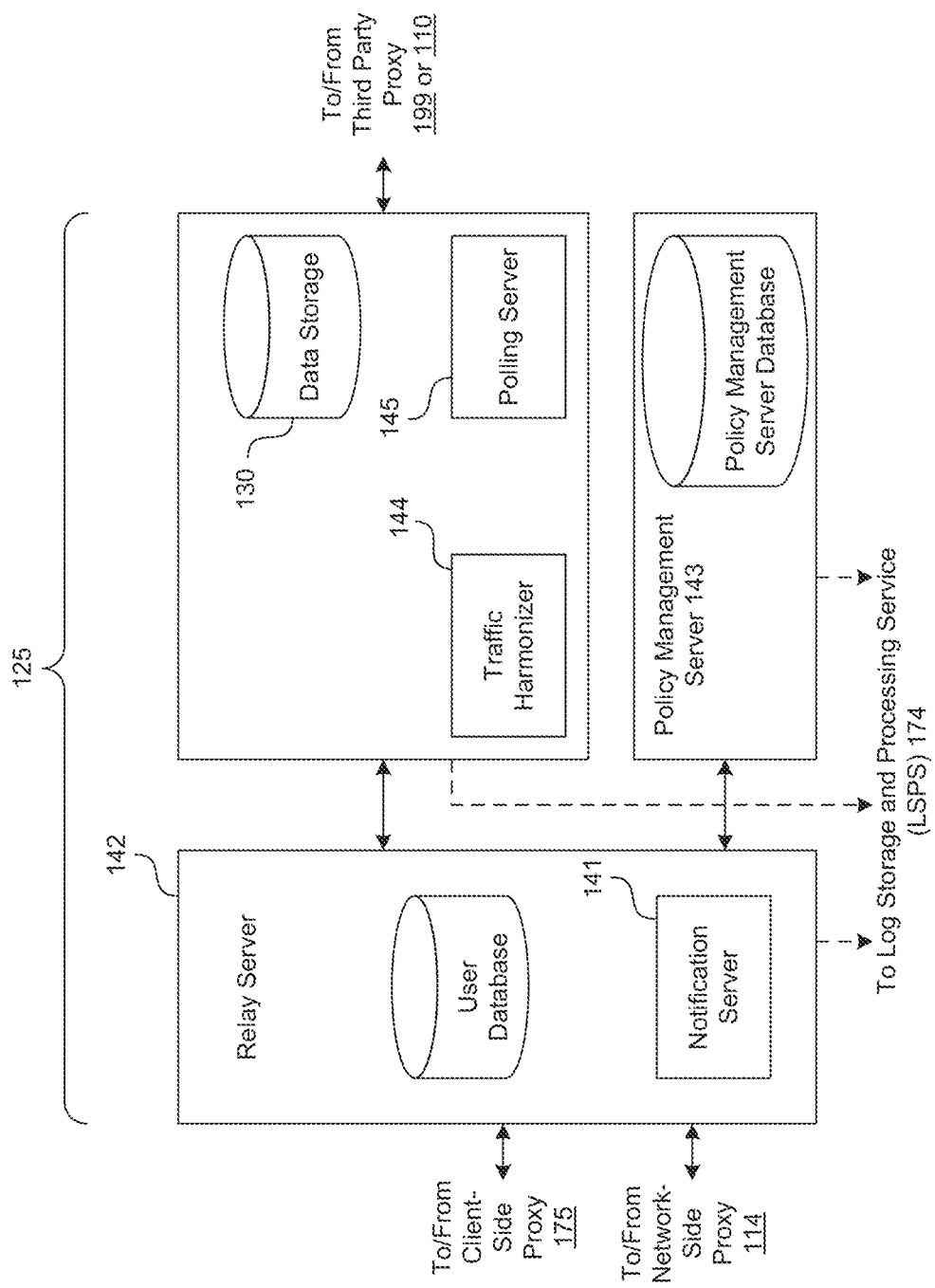
FIG. 1G illustrates a diagram of example components on a server side of a distributed proxy and cache system.

FIG. 1G illustrates a diagram of example components n a server side of a distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, the network-side proxy 114 or other third party (e.g., application server/service provider 110 and/or other proxy 199) and/or the LSPS 174. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports (e.g., congestion reports), provisioning, platform setup, and so on.

Notification Server 141: The notification server 141 is a module able to connect to an operator's SMSC, gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (e.g., mobile device policies). It also allows administrators to notify the client-side proxies 175 about policy changes. In some embodiments, the PMS 143 allows administrators to configure and store policies for network-side proxies 114 (e.g., operator policies). For example, using the policy management server 143, each operator can configure the policies to work in the most efficient way for the unique characteristics of each particular mobile operator's network.

Log Storage and Processing Service 174: The log storage and processing service 174 collects information (e.g., logs) from the client side 175 and/or from the server side 125, and provides the tools for analyzing and producing reports and usage analytics that network operators can use for analyzing application signaling (e.g., determine percent reduction in application signaling), data consumption, congestion, improvement in battery performance, and the like.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 2A:
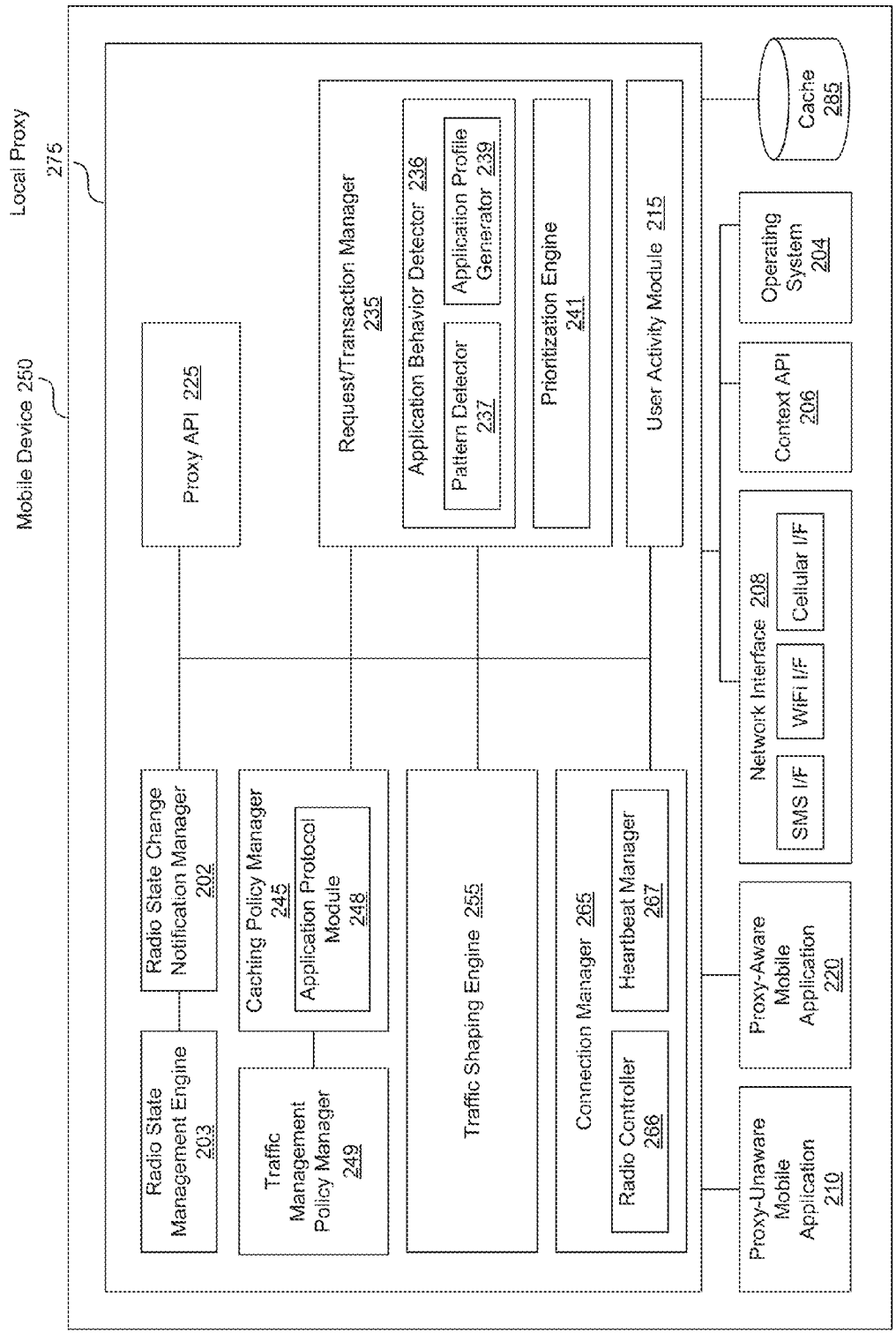
FIG. 2A illustrates a block diagram depicting an example of client-side components in a distributed proxy and cache system, including components for managing outgoing traffic from multiple applications on a mobile device to enhance mobile traffic management and resource conservation in a mobile network.

FIG. 2A illustrates a block diagram depicting an example of client-side components in a distributed proxy and cache system, including components for managing outgoing traffic from multiple applications on a mobile device 250 to enhance mobile traffic management and resource conservation in a mobile network.

The mobile device 250, which can be a device that is portable or mobile (e.g., any wireless device), such as a portable phone, generally includes, for example, a network interface 208, an operating system 204, a context API 206, and mobile applications which may be proxy-unaware 210 or proxy-aware 220. Note that the client device 250 is specifically illustrated in the example of FIG. 2A as a mobile device, such is not a limitation and that mobile device 250 may be any wireless, broadband, portable/mobile or non-portable device able to receive, transmit signals to satisfy data requests over a network including wired or wireless networks (e.g., Wi-Fi, Bluetooth, LAN, WAN, and the like).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, Wi-Fi interface, interfaces for various generations of mobile communication standards including but not limited to 2G, 3G, 3.5G, 4G, LTE, and the like), Bluetooth, or whether or not the connection is via a router, an access point, a wireless router, a switch, a multilayer switch, a protocol converter, a gateway, a bridge, a bridge router, a hub, a digital media receiver, and/or a repeater.

The mobile device 250 can further include, client-side components of the distributed proxy and cache system which can include, a local proxy 175 (e.g., a mobile client of the mobile device 250) and a cache 285. In one embodiment, the local proxy 175 includes a user activity module 215, a proxy API 225, a request/transaction manager 235, a caching policy manager 245 having an application protocol module 248, a traffic management policy module 249, a traffic shaping engine 255, a connection manager 265, a radio state management engine 203 and/or a radio state change notification manager 202. The connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239.

In one embodiment, a portion of the distributed proxy and cache system for mobile traffic management resides in or is in communication with the mobile device 250, including local proxy 175 (mobile client) and/or cache 285. The local proxy 175 can provide an interface on the mobile device 250 for users to access device applications and services including email, IM, voice mail, visual voicemail, feeds, Internet, games, productivity tools, or other applications, etc.

The local proxy 175 is generally application independent and can be used by applications (e.g., both proxy-aware and proxy-unaware applications 210 and 220 and other mobile applications) to open TCP (Transport Control Protocol) or other protocol based connections to a remote server (e.g., the server 100 in the examples of FIG. 1B-1C and/or server proxy 125 shown in the examples of FIG. 1B. In some instances, the local proxy 175 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients. RSS management applications, application stores, document management applications, productivity enhancement applications, and the like. The applications can be provided with the device OS, by the device manufacturer, by the network service provider, downloaded by the user, or provided by others.

One embodiment of the local proxy 175 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the mobile device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1B-1C) which can communicate (e.g., via a cellular or other network) with the device 250 to modify its communication frequency with the device 250. The local proxy 175 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 or the network-side proxy 114 in the examples of FIG. 1B-1C) send the data that was buffered as a result of the previously decreased communication frequency.

In addition, or in alternative, the local proxy 175 can communicate the characteristics of user activity at the device 250 to the remote device (e.g., host server 100 or the network-side proxy 114 in the examples of FIG. 1B-1C) and the remote device determines how to alter its own communication frequency with the device 250 for network resource conservation and conservation of resources of the mobile device 250.

One embodiment of the local proxy 175 further includes a request/transaction manager 235, which can detect, identify, intercept, process and manage data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user can in general set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate deletion of the message from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 175 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the accumulated low priority events when a higher priority event is initiated or detected at the device 250. Batch transfer can otherwise be initiated when radio use is triggered for another reason (e.g., to receive data from a remote device such as host server 100, network-side proxy 114). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

Figure 5A:
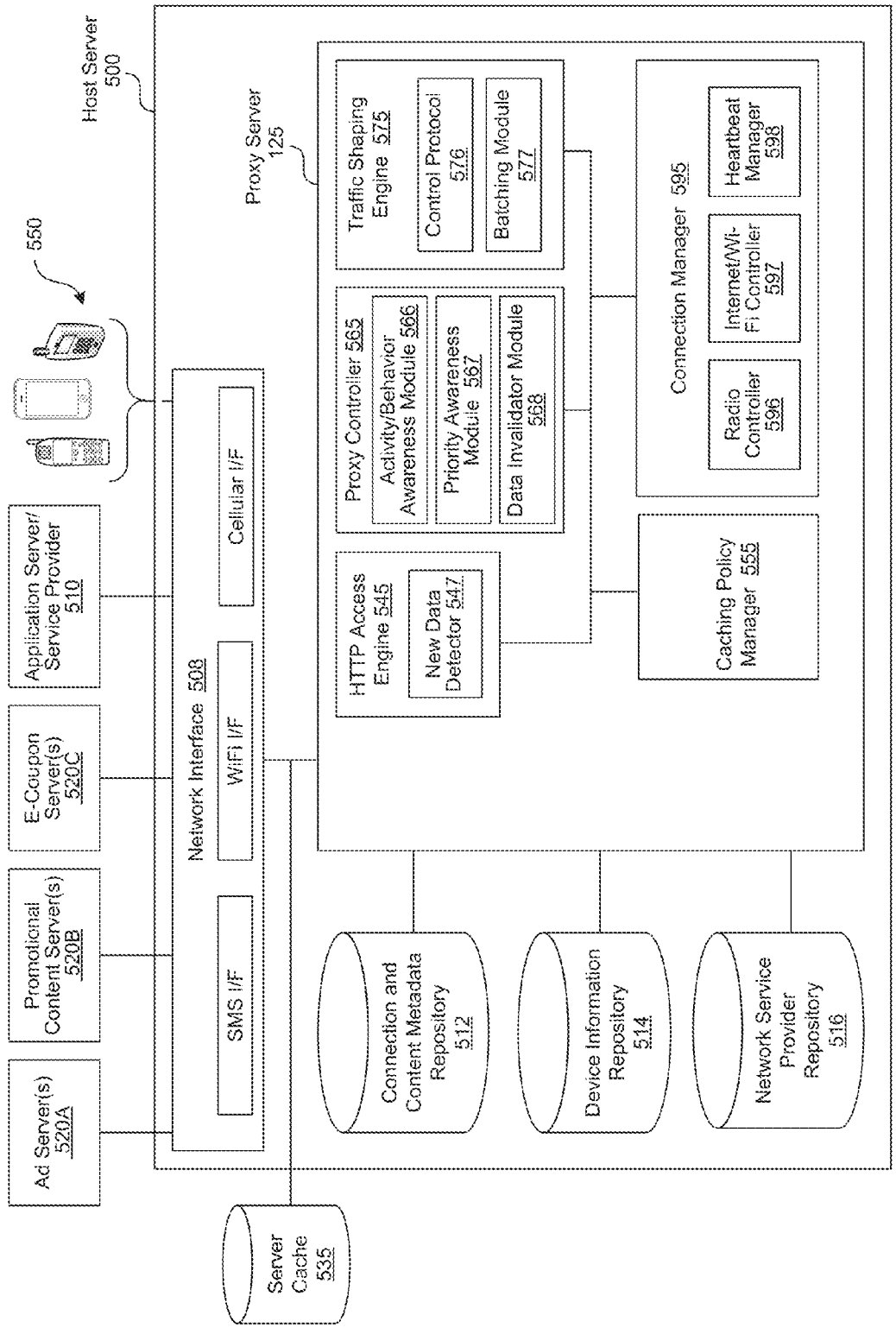
FIG. 5A depicts a block diagram illustrating an example of server-side components, in certain embodiments of a distributed proxy and cache system that manages traffic in a wireless network (or broadband network) for resource conservation, content caching, and/or traffic management. In some embodiments, the server-side proxy (or proxy server) can further categorize mobile traffic and/or deploy and/or implement policies such as traffic management and delivery policies based on device state, application behavior, content priority, user activity, and/or user expectations.

In one embodiment, the local proxy 175 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100 as shown in FIG. 1B, the host server 500 as shown in FIG. 5A or a content provider/application server such as the server/provider 110 shown in the examples of FIGS. 1B-1C). As such, the local proxy 175 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 175 can query a remote proxy (e.g., the server proxy 125 of FIGS. 5A-5C) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

Figure 5B:
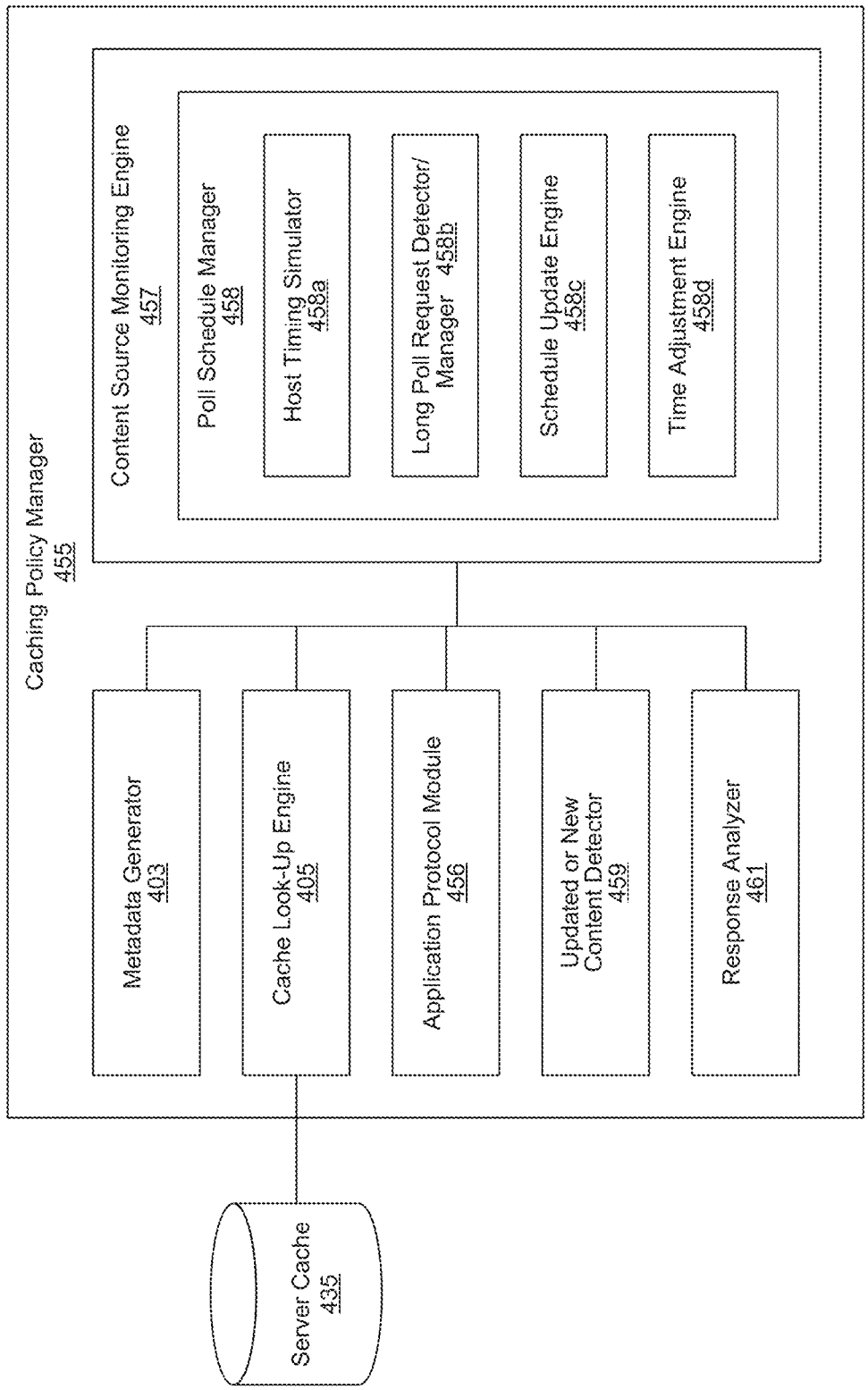
FIG. 5B depicts a block diagram illustrating a further example of components in a caching policy manager in the distributed proxy and cache system shown in the example of FIG. 5A which is capable of caching and adapting caching strategies for mobile application behavior and/or network conditions. Components capable in some embodiments of detecting long poll requests and managing caching of long polls are also illustrated.
Figure 5C:
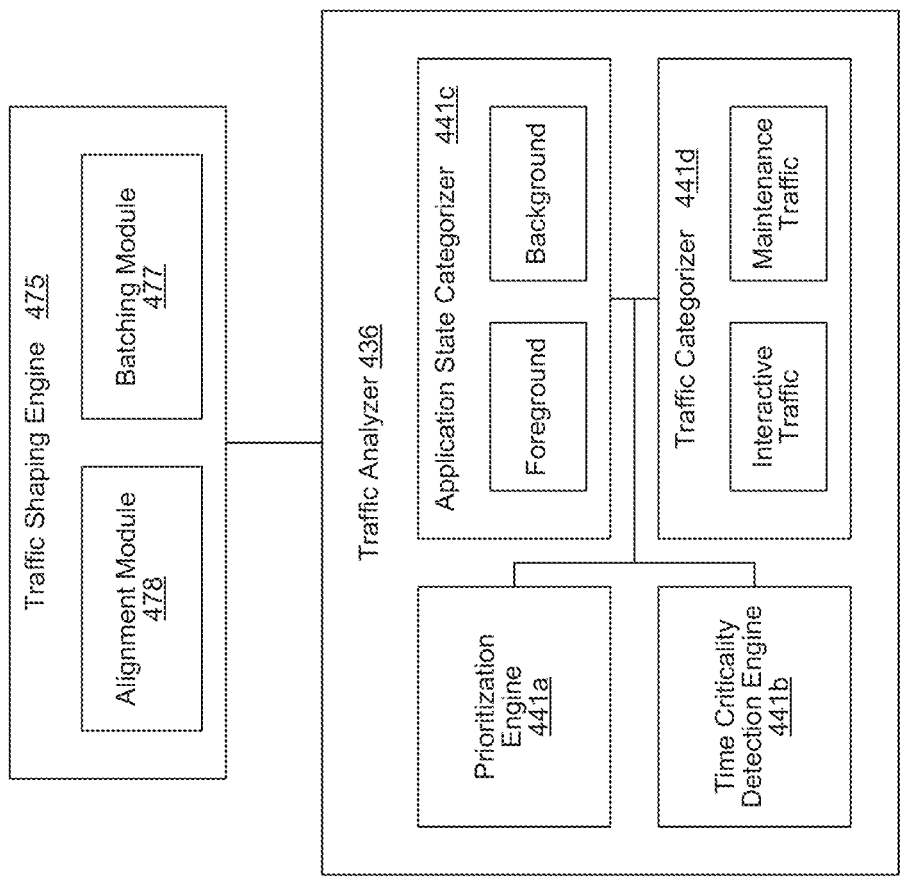
FIG. 5C depicts a block diagram illustrating examples of additional components in certain embodiments in a proxy server shown in the example of FIG. 5A which is further capable of performing mobile traffic categorization and policy implementation based on application behavior and/or traffic priority to enhance mobile traffic management and resource conservation in a mobile network.

If a valid cache response is not available, or if cache responses are unavailable for the intercepted data request, the local proxy 175, for example, the caching policy manager 245, can send the data request to a remote proxy (e.g., server proxy 125 of FIGS. 5A-5C) which forwards the data request to a content source (e.g., application server/content provider 110 of FIG. 1B) and a response from the content source can be provided through the remote proxy, as will be further described in the description associated with the example host server 500 of FIGS. 5A-5C. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 175 allows for optimization of any protocol that can be port mapped to a handler in the distributed proxy (e.g., port mapped on the proxy server 125 in the example of FIGS. 5A-5C).

In one embodiment, the local proxy 175 notifies the remote proxy such that the remote proxy can monitor responses received for the data request from the content source for changed results prior to returning the result to the device 250, for example, when the data request to the content source has yielded same results to be returned to the mobile device. In general, the local proxy 175 can simulate application server responses for applications on the device 250, using locally cached content. This can prevent utilization of the cellular network for transactions where new/changed data is not available, thus freeing up network resources and preventing network congestion.

In one embodiment, the local proxy 175 includes an application behavior detector 236 to track, detect, observe, monitor, applications (e.g., proxy-aware and/or unaware applications 210 and 220) accessed or installed on the device 250. Application behaviors, or patterns in detected behaviors e.g., via the pattern detector 237) of one or more applications accessed on the device 250 can be used by the local proxy 175 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250 when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 175 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

In some embodiments, the traffic management policy manager 249 can manage and implement traffic management policies such as traffic blocking policies, delaying policies, transmission policies, and/or the like. The policy manager 249 may trigger certain policies when certain conditions are met or certain events occur. For example, traffic blocking and delaying policies may be enforced on low priority traffic when a radio of the mobile device is idle. During a period of enforcement for a given policy, traffic that matches the policy rule set may be impacted (e.g., temporarily blocked, permanently blocked, delayed, or the like). When the enforcement period ends, a radio connection may be established (e.g., via the connection manager 265) and new connection requests may propagate across the network as usual. Any delayed or temporarily blocked traffic may be dispatched to their respective destinations in accordance with certain transmission policies, for example, which may come into effect when a predefined period of time expires or the radio of the mobile device comes up for other reasons (e.g., backlight turns on, user initiates a request, etc.).

In some embodiments, the radio state management engine 203 can perform the management and/or policy management of mobile device radio state promotion or demotion based on buffer, activity and/or device state monitoring. The radio state management engine 203 can determine what user activity and/or data activity should justify a radio state promotion and communicate the information to the network to be implemented as a single session, multi-session, or global policy (e.g., via a policy manager component on the network side proxy 114 of FIG. 4. This policy can be used to execute the appropriate level of throttling to prevent the radio from going to higher powered states when unjustified based on dynamic conditions (e.g., network status, traffic, congestion, user expectations, user behavior, other activity, and the like.).

In some embodiments, the radio state change notification manager 202 can monitor or track a radio state of the mobile device 250 and notify the network-side proxy 114 when the radio state is promoted to active. The notification can, for example, trigger the network-side proxy 114 to initiate transfer of delayed traffic to the mobile device 250. In some other embodiments, the local proxy 175 may include a notification manager (not shown) that provides the network-side proxy 114 information on the mobile device state, user activity, application behavior, and the like. Such information may be utilized by the network-side proxy to intelligently manage incoming traffic at the network-side, and optimize signaling and conserve network and device resources.

The local proxy 175 generally represents any one or a portion of the functions described for the individual managers, modules, and/or engines. The local proxy 175 and device 250 can include additional or less components; more or less functions can be included, in whole or in part, without deviating from the novel art of the disclosure.

Figure 2B:
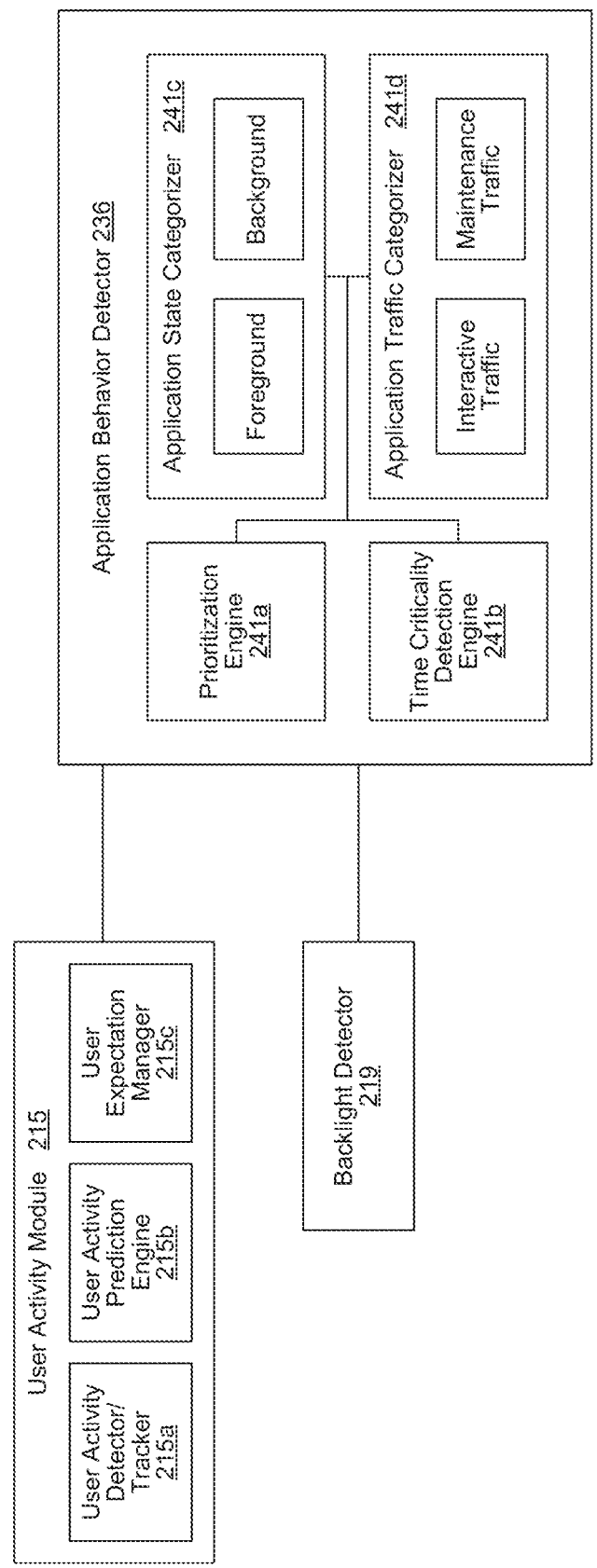
FIG. 2B illustrates a block diagram depicting additional components in a user activity module and an application behavior detector shown in the example of FIG. 2A.

FIG. 2B illustrates a block diagram depicting additional components in a user activity module and an application behavior detector shown in the example of FIG. 2A.

One embodiment of the local proxy 175 includes the user activity module 215, which further includes one or more of, a user activity detector/tracker 215a, a user activity prediction engine 215b, and/or a user expectation manager 215c. The application behavior detector 236 can further include a prioritization engine 241a, a time criticality detection engine 241b, an application state categorizer 241c, and/or an application traffic categorizer 241d. The local proxy 175 can further include a backlight detector 219.

In one embodiment, the application behavior detector 236 may detect, determine, identify, or infer the activity state of an application on the mobile device 250 from which traffic has originated or is directed to, for example, via the application state categorizer 241c and/or the application traffic categorizer 241d. The activity state can be determined based on whether the application is in a foreground or background state on the mobile device (via the application state categorizer 241c) since the traffic for a foreground application versus a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, and the like. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application, and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241a) and/or is not time-critical (e.g., by the time criticality detection engine 214b).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241a) and/or as being time critical/time sensitive (e.g., by the time criticality detection engine 241b).

The time criticality detection engine 241b can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the hatching module 257). The alignment module 256 can also align polling requests occurring close in time directed to the same host server, since these request are likely to be responded to with the same data. In some instances, the timing for withholding or delaying traffic and timing for allowing any delayed or new traffic to the network can be based on traffic management policies.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215a. The traffic resulting therefrom can then be categorized appropriately for subsequent processing to determine the policy for handling. Furthermore, user activity can be predicted or anticipated by the user activity prediction engine 215b. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215 and/or the prediction engine 215b) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by a network configuration selection engine) on the mobile device 250 in sending traffic between the mobile device and a proxy server and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

Figure 2C:
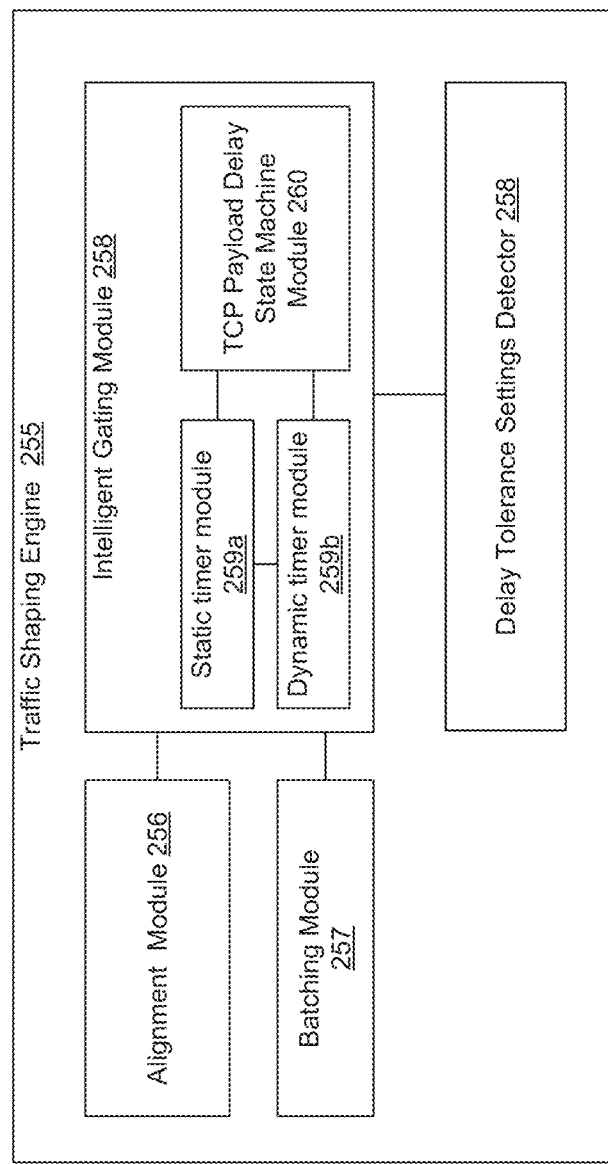
FIG. 2C illustrates a block diagram depicting additional components in a traffic shaping engine shown in the example of FIG. 2A.
Figure 3:
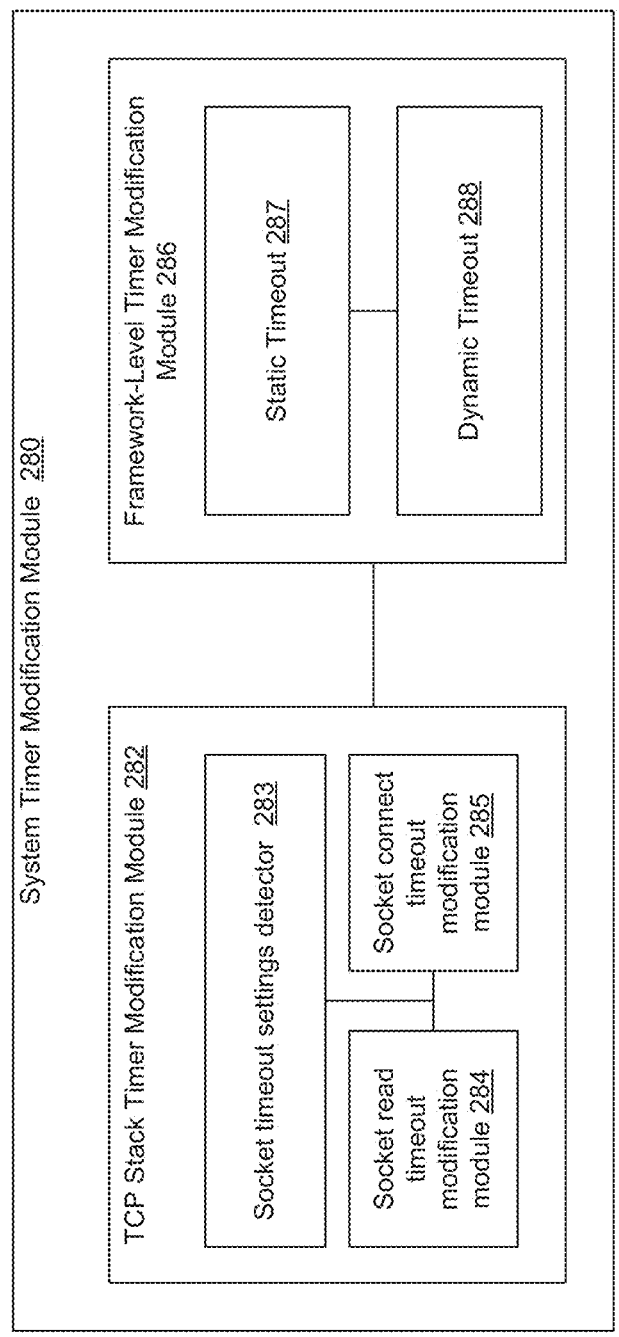
Figure 4:
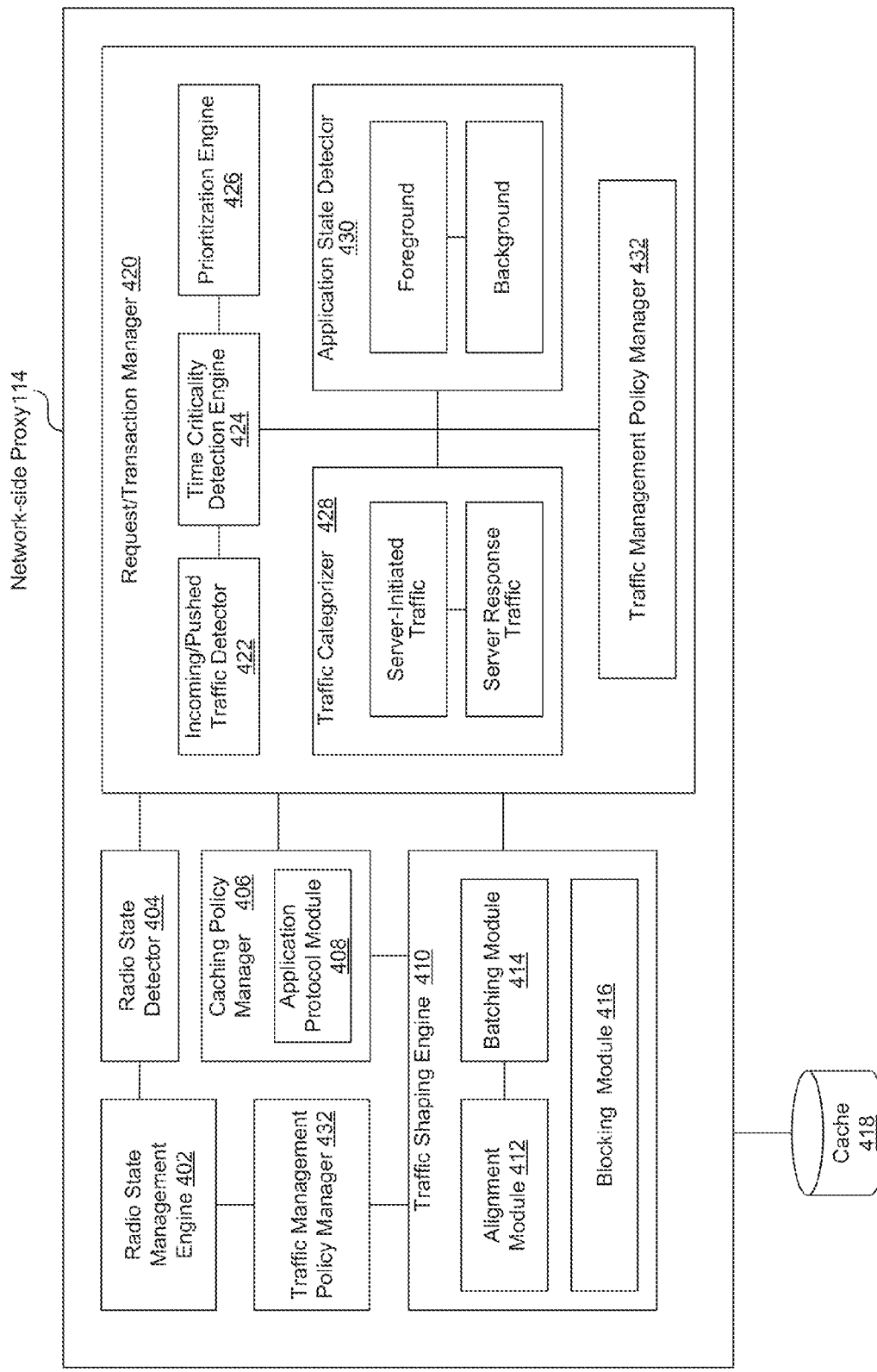

FIG. 2C illustrates a block diagram depicting additional components in a traffic shaping engine 255 shown in the example of FIG. 2A. The traffic shaping engine 255 may further include an alignment module 256, a batching module 257, a delay tolerance settings detector 258 and an intelligent gating module 258 having a static timeout module 259a, a dynamic timeout module 259b and a TCP payload delay state machine module 260. More or less modules may be included in the traffic shaping engine 255. For example, some of the modules may be consolidated into a single module.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the accumulated low priority events when a higher priority event is initiated or detected at the device 250. Batch transfer can otherwise be initiated when radio use is triggered for another reason (e.g., to receive data from a remote device such as host server 100, network-side proxy 114). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background. Users can optionally be prompted before initiating a hatch transfer and/or users can also manually trigger batch transfers.

In one embodiment, the local proxy 175 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100 as shown in FIG. 1B or a content provider/application server such as the server/provider 110 shown in the examples of FIGS. 1B-1C). As such, the local proxy 175 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 175 can query a remote proxy (e.g., the server proxy 125 of FIGS. 5A-5C) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

If a valid cache response is not available, or if cache responses are unavailable for the intercepted data request, the local proxy 175, for example, the caching policy manager 245, can send the data request to a remote proxy (e.g., server proxy 125 of FIGS. 5A-5C) which forwards the data request to a content source (e.g., application server/content provider 110 of FIG. 1B) and a response from the content source can be provided through the remote proxy, as will be further described in the description associated with the example host server 100 of FIGS. 5A-5C. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSyne. In one embodiment, application specific handlers (e.g., via the application protocol module 246 of the caching policy manager 245) on the local proxy 175 allows for optimization of any protocol that can be port mapped to a handler in the distributed proxy (e.g., port mapped on the proxy server 125 in the example of FIGS. 5A-5C).

In one embodiment, the local proxy 175 notifies the remote proxy such that the remote proxy can monitor responses received for the data request from the content source for changed results prior to returning the result to the device 250, for example, when the data request to the content source has yielded same results to be returned to the mobile device. In general, the local proxy 175 can simulate application server responses for applications on the device 250, using locally cached content. This can prevent utilization of the cellular network for transactions where new/changed data is not available, thus freeing up network resources and preventing network congestion.

In one embodiment, the local proxy 175 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 175 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110, ad server 120a, promotional content server 120b, e-Coupon server 120c as shown in FIGS. 1B-1C) that would result from the application requests that would be performed at the mobile device or wireless device 250 to be performed instead, by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250 when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded can notify the device 250.

In one embodiment, the local proxy 175 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

In some embodiments, the traffic management policy manager 249 can manage and implement traffic management policies such as traffic blocking policies, delaying policies, transmission policies, and/or the like. The policy manager 249 may trigger certain policies when certain conditions are met or certain events occur. For example, traffic blocking and delaying policies may be enforced on low priority traffic when a radio of the mobile device is idle. During a period of enforcement for a given policy, traffic that matches the policy rule set may be impacted (e.g., temporarily blocked, permanently blocked, delayed, or the like). When the enforcement period ends, a radio connection may be established (e.g., via the connection manager 265) and new connection requests may propagate across the network as usual. Any delayed or temporarily blocked traffic may be dispatched to their respective destinations in accordance with certain transmission policies, for example, which may come into effect when a predefined period of time expires or the radio of the mobile device comes up for other reasons (e.g., backlight turns on, user initiates a request, etc.).

In some embodiments, the radio state management engine 203 can perform the management and/or policy management of mobile device radio state promotion or demotion based on buffer, activity and/or device state monitoring. The radio state management engine 203 can determine what user activity and/or data activity should justify a radio state promotion and communicate the information to the network to be implemented as a single session, multi-session, or global policy (e.g., via a policy manager component on the network side proxy 114 of FIG. 4. This policy can be used to execute the appropriate level of throttling to prevent the radio from going to higher powered states when unjustified based on dynamic conditions (e.g., network status, traffic, congestion, user expectations, user behavior, other activity, and the like).

In some embodiments, the radio state change notification manager 202 can monitor or track a radio state of the mobile device 250 and notify the network-side proxy 114 when the radio state is promoted to active. The notification can, for example, trigger the network-side proxy 114 to initiate transfer of delayed traffic to the mobile device 250. In some other embodiments, the local proxy 175 may include a notification manager (not shown) that provides the network-side proxy 114 information on the mobile device state, user activity, application behavior, and the like. Such information may be utilized by the network-side proxy to intelligently manage incoming traffic at the network-side, and optimize signaling and conserve network and device resources.

In some embodiments of the traffic shaping engine 255, the delay tolerance settings detector 258 can determine, detect, and/or track the delay tolerance settings (e.g., initial and/or extended delay tolerance) applications. The delay tolerance settings may include the timeout settings of application-specific timers, the modified protocol-specific timeouts and/or the modified TCP stack timeouts, for example.

In some embodiments, based on a given delay tolerance (e.g., for applications that have their own independent timers) or an extended delay tolerance (e.g., for applications that rely on TCP stack timers), the alignment module can align keepalives, other non-user interactive traffic to radio or other events, low priority traffic, and/or other specific types of traffic.

In other embodiments, based on the delay tolerance, the intelligent gating delay module 258 can determine how long traffic should be gated or delayed or when a radio on a mobile device should be turned on or promoted. For example, if an HTTP-based timer has been modified to have a timeout of five minutes, the intelligent gating delay module 258 can gate or delay traffic from multiple HTTP-based applications for about four minutes, and can then trigger the connection manager 265 to turn on or promote the radio on the mobile device to let the gated or delayed traffic go out to the network. If the radio is turned on for other reasons, for example at the three minute mark, the delayed traffic can be transferred using the established radio link, and the process of gating or delaying the traffic can restart when the radio is turned down.

In some embodiments, the intelligent gating module 258 may include a static timer module 259a, a dynamic timer module 259b and a TCP payload delay state machine module 260. The static timer module 259a can determine or define a period of time for delaying traffic from multiple applications. The static delay time may be a static value that is predefined for applications and/or traffic type. For example, traffic from all HTTP-based applications can be associated with a delay time of 5 minutes, or a delay time that is 95% of the delay tolerance. The dynamic timer module 259b can determine or define a period of time for delaying traffic from multiple applications at run time, while taking into account information relating to device state, user activity, time of day, policy and/or the like. For example, dynamic delay timer can be set to 10 minutes during midnight and five in the morning, and to 4 minutes for the rest of the hours of a day. Similarly, a dynamic delay timer can be set to a longer period when a screen is off than when a screen is on.

In some embodiments, the TCP payload delay state machine 260 can delay TCP payloads/data packets for gating purpose in the client-side proxy 175 using a state machine. The example state machine 260 has four states, and based on triggers, the state of the TCP state machine can change. A TCP listen state is the first state during which the client-side proxy is waiting for a request to establish a data connection (i.e., TCP connect) and/or a payload (i.e., TCP payload) from an application. When the TCP connect and payload is received, the TCP listen state transitions into the TCP payload gating delay state, where the client-side proxy delays the TCP payload for a period of time according to a variable gating delay trigger (e.g., as determined by static or dynamic timers). When the gating delay period of time ends, the TCP payload gating delay state transitions to a TCP relay state. During the TCP relay state, the TCP connect and payloads are transferred to the network. At the end of the transfer, the TCP end session state is reached, where the TCP connection is closed by the client-side proxy 175. TCP payload delay state machines are described in further detail with respect to FIGS. 6A-1, 6A-2, 6BA-1 and 6B-2.

The local proxy 175 generally represents any one or a portion of the functions described for the individual managers, modules, and/or engines. The local proxy 175 and mobile device 150 can include additional or less components; more or less functions can be included, in whole or in part, without deviating from the novel art of the disclosure.

FIG. 3 illustrates a block diagram depicting example components in a system timer modification module 280. In some embodiments, the system timer modification module 280 may be deployed as a customized read only memory (hereinafter "custom ROM") that replaces the firmware on the mobile device 150 to provide system timer modification functionalities. In some other embodiments, the system timer modification module 280 can be deployed as a firmware update. For example, the system timer modification module 280 can be deployed as a framework wrapper or plugin in Android devices. In other embodiments, the system timer modification module 280 may be integrated or included with the OS (i.e. a part of the stock OS) by OS manufacturers. In yet other embodiments, carriers and/or mobile device manufacturers can integrate or include the system timer modification module 280 into the OS of mobile devices.

In some embodiments, the system timer modification module 280 may include at least one of a TCP stack timer modification module 282 and a framework level timer modification module 286.

One embodiment of the TCP stack timer modification module 282 can be used to delay or defer TCP socket establishment and/or reading, which allows alignment of TCP keepalive and/or other non-user interactive traffic or low priority traffic. When applications are installed on a mobile device, the applications have their own predefined timeouts for handling TCP communication, which can be set by application developers. When a change is made at the TCP level, other traffic such as HTTP traffic that go over TCP are also affected. Typically applications set these timers to allow application sockets to close when necessary data transfer has been completed. However, closing of the sockets after some time means that traffic cannot be delayed longer than allowed by the socket timeouts.

The socket timeout settings detector 283, in one embodiment, can detect the timeout settings for all sockets (e.g., Java sockets) created by applications. In other embodiments, the socket timeout settings detector 283 can detect timeout settings for sockets associated with select applications (e.g., applications in a list for mobile traffic optimization), or traffic over certain protocols (e.g., HTTP requests, HTTPS requests). The detector 283 can further read socket logs created by applications running on the mobile device. An example socket log in JSON format for an application "LINE" is as follows:

```
{'socketlog':'setOption','object':'Socket[addr=ga2.line.nav
er.jp/119.235.235.91,port=9418,localport=36962]','option':4
102,'value':5000,'localport':36962,'address':'ga2.line.nave
r.jp/119.235.235.91','port':9418}
```

In the above example socket log, the value of "5000" milliseconds or 5 seconds is the application's timeout value for reading from an already established socket.

In one embodiment, the socket read timeout modification module 284 can defer or delay reading from an already established socket. Typically, a timeout exception can occur at an established socket when an application does not hear anything from its application server for a predefined period of time (usually a few seconds). The timeout exception is usually followed by the application's specific mechanism of retries to deal with connectivity issues. The socket read timeout modification module 284 can modify or overwrite a read timeout parameter to delay reading from the socket. In the example socket log for "LINE" application shown above, the read timeout was initially set to a value of "5000" milliseconds or 5 seconds by the application. The socket read timeout modification module 284 can overwrite the initial read timeout value of 5 seconds to a new value of "0" as shown by the socket log below. The new read timeout value prevents the "LINE" application from timing out (i.e., the application never times out or in practice, the application does not time out for a long time).

```
{'socketlog':'setOption','object':'Socket[addr=ga2.line.nav
er.jp/119.235.235.91,port=9418,localport=36962]','option':4
102,'new_value':0,'localport'=36962,'address':'ga2.line.nav
er.jp/119.235.235.91','port':9418}
```

By way of another example, for the application "YahooMail," the socket log below shows that the read timeout was overwritten to a new value of "0." In this particular example, the "YahooMail" application did not specify an initial read timeout value and thus a system default for read timeout value would apply. The read timeout value was nevertheless overwritten to "0" that enables the application socket to remain active for a longer period of time.

```
{'socketlog':'setOption','object':'Socket[addr=android.conn
ector.push.bf.mobile.yahoo.com/66.196.116.132,port=8996,loc
alport=53846]','option':4102,'new_value':0,'localport':5384
6,'address':'android.connector.push.bf.mobile.yahoo.com/66.
196.116.132','port':8996}
```

The socket connect timeout modification module 285, in one embodiment, can modify a timeout associated with establishing of a socket for communication. Typically, when a socket for an application cannot be established before a period of time has elapsed, a connect timeout exception can occur. When a socket times out, the TCP stack can attempt a number of retries by sending TCP SYN packets with an increasing backoff algorithm, without the application being aware of it. The socket connect timeout modification module 285 can overwrite the initial connect timeout value to 0. Overwriting the connect timeout to 0 does not mean that the creation of the socket can be delayed indefinitely. Instead, the connect timeout is defined by the TCP stack parameters. For example, by default, the TCP stack can attempt at least 5 TCP SYN retries, which results in a connect timeout in the order of a few minutes instead of seconds (e.g., 3 minutes defined by RFC). As a result, creation of a socket can be delayed for much longer than initially allowed.

For example, for the application "LINE," the socket log below shows an initial connect timeout value of 10000 milliseconds or 10 seconds. If a connection is not established before the 10000 milliseconds or 10 seconds elapse, the application will timeout.

```
{'socketlog':'connect','object':'Socket[addr=ga2.line.naver
.jp/119.235.235.91,port=443,localport=49399]','connectTimeO
ut':10000,'localport':49399,'address':'ga2.line.naver.jp/11
9.235.235.91','port':443}
```

The socket connect timeout modification module 285 can overwrite the initial connect timeout value with a larger value of, for example, 20000 milliseconds or 20 seconds, thereby doubling the application's delay tolerance which allows the local proxy to optimize traffic management.

```
{'socketlog':'connect','object':'Socket[addr=ga2.line.naver
.jp/119.235.235.110,port=9418,localport=54251]','connectTim
eOut':20000,'localport':54251,'address':'ga2.line.naver.jp/
119.235.235.110','port':9418}
```

Some applications do not have independent timers, and can rely on higher level protocol stacks with independent timers (e.g., timers independent from the TCP stack timers) that can time out. When the protocol stack responds with a timeout, it can impact the optimization of traffic management. The framework-level timer modification module 286 in one embodiment of the system timer modification module 280 can modify protocol stack (e.g., HTTP, HTTPS, XMPP, and the like) parameters to prevent applications from timing out and thereby increase the delay tolerance.

In some embodiments, the framework-level timer modification module 286 can modify the protocol-specific timeouts using a static mechanism 287 or a dynamic mechanism 288. In the static mechanism 287, the protocol-specific timeouts are set to fairly large values, and the client-side proxy 175 determines the gating delay for aligning traffic. In the dynamic mechanism 288, the protocol-specific timeouts are decided dynamically, at run time, based on device state (e.g., screen on/off), user activity, policy, or other criteria. Applications can communicate with the client-side proxy 175 for such dynamically determined protocol-specific timeouts. Example protocol-specific API timeouts in the Android framework include setConnectTimeout, setConnectionTimeout, setSoTimeout and setReadTimeout. Following are examples of files and/or libraries in the Android framework that can be modified to overwrite the initial protocol-specific timeout values:

```
frameworks/base/core/java/android/net/LocalSocket.java
libcore/luni/src/main/java/java/net/Socket.java
libcore/luni/src/main/java/java/net/URLConnection.java
external/apache-
hhtp/src/org/apache/http/params/HttpConnectionParams.java
```

The modification to the TCP stack timers and/or framework level timers are performed on selected data streams from multiple applications before the data streams reach the TCP stack, thereby allowing the TCP stack to apply the increase timeouts to the application sockets.

In some embodiments, various other TCP stack parameters may be modified for aligning of keepalives, and/or other non-user-interactive traffic. For example, TCP stack parameters such as round trip timeouts (TCP_RTO_MAX, TCP_RTO_MIN), initial round trip value (TCP_TIMEOUT_INIT), MAX_TCP_KEEPIDLE, MAX_TCP_KEEPINTVL, MAX_TCP_KEEPCNT, MAX_TCP_SYNCNT, TCP_DELACK_RETRIES, TCP_ORPHAN_RETRIES, TCP_RETR1, TCP_RETR2, TCP_SYN_RETRIES, TCP_SYNACK_RETRIES, and the like. Many of these TCP stack parameters are defined in RFC 1122 published by the Internet Engineering Task Force (IETF).

FIG. 4 illustrates a block diagram depicting an example of network-side components in a distributed proxy and cache system, including components for managing incoming traffic from third-party servers to enhance mobile traffic management in a mobile network and conserve resources.

In some embodiments, the network-side proxy 114 includes a radio state detector 402, a policy manager module 404, a traffic shaping engine 410 and a request/transaction manager 420. The policy manager module 404 may further include a radio state policy manager 406, a caching policy manager 407 and a traffic management policy manager 408. The traffic shaping engine 410 may further include an alignment module 412, a batching module 414 and/or a blocking module 416. The request/transaction manager 420 may further include a time criticality detection engine 424, a prioritization engine 426, a traffic detector/categorizer 428, an application state detector 430 and a device state detector 432. More or less components may be present in the network-side proxy 114 and/or each illustrated component of the network-side proxy 114.

One embodiment of the network-side proxy 114 includes a radio state detector 402 which tracks, detects, determines, estimates or receives information concerning radio states of mobile devices that connect to an operator's mobile network where the network-side proxy 114 resides. In some embodiments, the radio state detector 402 can be aware of radio states of mobile devices, and determine whether a mobile device is idle or active at any given time based on the traffic from mobile devices tunneling through the network-side proxy 1140 in embodiments where the network-side proxy 114 is integrated to the radio access network, the radio state detector 404 can be aware of the radio state of mobile devices based on information from the network. In other embodiments, the radio state detector 402 may obtain radio state information from the local proxy 175 and/or the proxy server 125 which can provide real time information on radio state promotions (e.g., transition from idle to active state) and demotions (e.g., transition from active to idle state). Receiving real time radio state information from the local proxy 175 and/or proxy server 125 could add bandwidth overhead. However, knowing the radio state information of a mobile device allows the network-side proxy 114 to manage incoming traffic in an efficient manner, without having to cause the mobile device to turn on or promote its radio every time data packets are received from third-party servers.

One embodiment of the network-side proxy 114 includes the request/transaction manager 420 which can detect, identify, intercept, process and/or manage incoming traffic initiated by third-party servers 110 as well as server responses (e.g., HTTP responses) to data requests from one or more applications on the mobile device 250. The request/transaction manager 420 can determine how and when to process a given request or transaction, or a set of requests or transactions, based on one or more criteria that may include, for example, transaction characteristics, network settings (e.g., inactivity or dormancy timers), and the like. In some embodiments, the transaction characteristics may depend on whether the transaction (e.g., HTTP response from third-party server) was a result of user-interaction or other user initiated action on the mobile device (e.g., user interaction with a mobile application), or if the transaction was initiated by the server (e.g., server-initiated data push). Transaction characteristics can also depend on the amount of data that will be transferred or is anticipated to be transferred as a result of the request/requested transaction.

In some embodiments, the request/transaction manager 420 can prioritize requests or transactions made by third-party servers and/or third-party server responses to requests made by applications on the mobile device 250 via the prioritization engine 426 for example. Importance or priority of requests/transactions can be determined by the request/transaction manager by applying a rule set, for example, according to time sensitivity of the transaction, time sensitivity of the content in the transaction, time criticality of the transaction, time criticality of the data transmitted in the transaction, and/or time criticality or importance of an application to which the transmission is directed to. The time criticality of the transactions may be detected via the time criticality detection engine 424. In general, a time critical transaction can include a transaction that is responsive to a user-initiated request, and can be prioritized as such. In some implementations, a time critical transaction is one that includes information having an expiry date/time (e.g., stock prices, weather, etc.) or information pertaining to applications whose operations or functions may be impaired if such information is delayed or blocked.

In general, the priorities can be determined or set in default, for example, based on device platform, device manufacturer, operating system, etc. Priorities can alternatively or additionally be set by the particular application/server. For example, the Facebook mobile application/server can set its own priorities for various transactions (e.g., a status update can be of higher priority than an add friend request or a poke request, a message can be of higher priority than a notification of tagging, for example), an email application/server or IM chat application/server may have its own configurations for priority. The prioritization engine 426 may include set of rules for assigning priority.

The prioritization engine 426 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook related transactions to have a higher priority than LinkedIn related transactions), for specific transaction types (e.g., for all send message requests across all applications to have higher priority than message delete requests, for all calendar-related events to have a high priority, etc.), and/or for specific folders.

The prioritization engine 426 can track and resolve conflicts in priorities set by different entities. For example, manual settings specified by the user may take precedence over device OS settings; and network provider parameters/limitations (e.g., set in default for a network service area, geographic locale, set for a specific time of day, or set based on service/fee type) may limit any user-specified settings and/or application-set priorities. In some instances, data response to a manual sync request received from a user can override some, most, or all priority settings in that the requested synchronization is performed when requested, regardless of the individually assigned priority or an overall priority ranking for the requested action.

In some embodiments, the traffic categorizer 428 can analyze traffic from third-party servers and categorize such traffic as server-initiated traffic or server-response traffic, for example. The traffic categorizer 428 can, via the prioritization engine 426 and/or time criticality detection engine 424, categorize traffic into priority-based categories (e.g., high, medium or low priority traffic). In some embodiments, the traffic categorizer 428 can further detect traffic from third-party servers relating to socket closures (e.g., FIN packets) or for checking if the client is still connected. Each categories of traffic may be handled in one or more ways by the network-side proxy 114 via the request/transaction manager 420, traffic shaping engine 410, and the like.

In some embodiments, the application state detector 430 detects the foreground or background state of applications on a mobile device 250 (e.g., using information reported by the local proxy 175 and/or the server proxy 125). Information concerning the state of the applications may be used by the network-side proxy 114 to determine traffic from which third-party server(s) should be prioritized for transfer, for example. The device state detector 432, in some embodiments, detects whether a mobile device is in active mode (e.g., back light is on or there is user interaction), or if the device is in an idle or passive mode (e.g., back light is off). Information relating to device state may be used in managing or shaping incoming traffic.

In some embodiments, the traffic shaping engine 410 may shape or manage server-initiated traffic and/or server response traffic. The traffic shaping engine 410 may utilize transaction characteristics, priority, time criticality, application state, radio state, traffic category, device state, and the like in shaping or managing traffic. For example, in one implementation, in response to determining that the radio state of a mobile device is idle, the traffic shaping engine 410 can delay low priority traffic from third-party servers at the network-side for a period of time, or until one or more conditions are met. For example, the network-side proxy 114 may continue to delay the low priority traffic until the radio state of the mobile device is promoted to a connected state.

One embodiment of the radio alignment module 412 of the traffic shaping engine 410 can align traffic from multiple third-party servers to optimize the number of radio turn on events and the amount of data that can be transferred to the mobile device in each radio event. In some implementations, the optimization may not necessarily minimize the number of radio turn on events or maximize the amount of data that can be transferred per event, since such optimization may also take into account other conditions or characteristics such as time criticality or urgency of some of the requests. For example, when an incoming request is time critical or high priority, the network-side proxy 114 can allow the radio on the mobile device to turn on so that the time critical or high priority incoming request can be transferred to the mobile device without delay.

The radio alignment module 412 can delay server initiated and/or server response traffic to achieve alignment with radio turn on events. When a radio turn on event is detected (e.g., via radio state detector 402), the traffic shaping engine 410 can allow the delayed requests and/or responses to be transferred to the mobile device. In addition, the traffic shaping engine 410 can allow multiple low priority transactions from third-party servers to accumulate for batch transferring to a mobile device 250 (e.g., via the batching module 414). The batching module 414 can initiate a batch transfer based on certain criteria. For example, a batch transfer of multiple occurrences of requests, some of which occurred at different instances in time, may occur after a certain number of low priority requests have been detected, after an amount of time elapses after the first of the low priority requests was initiated, or after an allocated buffer is filled. In addition, the batching module 414 can initiate a batch transfer of the accumulated low priority events when a higher priority event is received or detected at the network-side proxy 114. A batch transfer can otherwise be initiated when radio use is triggered at the mobile device for another reason (e.g., user interaction wakes up the mobile device). In some embodiments, the batching capability can be disabled or enabled at the transaction level, application level, or session level, based on any one or combination of the following: user configuration, device limitations/settings, manufacturer specification, network operator parameters/limitations, platform specific limitations/settings, device OS settings, etc.

The traffic shaping engine 410, in some embodiments, may also block some of the traffic from third-party servers that are determined to be unnecessary via the blocking module 416. For example, when existing TCP sockets on a mobile device side are closed and the radio is down, a third-party server's socket may timeout and attempt to terminate the connection by sending a FIN packet or testing whether the connection is still alive by pushing some data. The blocking module 416 may block such unnecessary data packets from being delivered to the local proxy 175 of the mobile device 250. In some embodiments, the network-side proxy 114 (via a caching policy manager 407) may use a safe response (e.g., from cache 418) to respond to the third party server to keep the server happy. In the example of the third-party server sending a FIN packet, the network-side proxy 114 via the caching policy manager 407 can respond with an ACK packet, which prevents the server TCP stack from making retry attempts, which usually incurs additional signaling.

One embodiment of the network-side proxy 114 includes a policy manager module 404, which can manage policies relating to radio states, caching and/or traffic management. In one embodiment, the radio state policy manager 406 may perform the functions of a Policy and Charging Rules Function (PCRF) node in managing radio states of mobile devices by throttling. The radio state policy manager 406 determines whether a mobile device is idle or active at any given time (e.g., via the radio state detector 402), and depending on this information, the radio state policy manager 406 can dictate whether components in the radio access network (e.g., eNodeB or Radio Network Controller (RNC)) policies that would, for example allow or forbid a radio channel status upgrade into a higher powered state, or lower the radio channel status to a lower powered state in a more intelligent and resource efficient manner. In some embodiments, the radio state policy manager 406 can perform throttling and the local proxy 175 and/or the proxy server 125 can provide the information to the network regarding the level of throttling should occur to trigger radio state changes to higher powered or lower powered states. The PCRF and details relating to promotion and demotion of radio states is described in detail in co-pending U.S. patent application Ser. No. 13/844,682 titled "Management of Mobile Device Radio State Promotion and Demotion," which is hereby expressly incorporated by reference.

The caching policy manager 407, in one embodiment, leverages data stored in the cache 418 to respond to incoming traffic or server response traffic, and thus obviate the need to establish a connection to a mobile device. The request/transaction manager 420 can intercept a request from a third-party server, and determine if there is a cached response in cache 418 that can be used as a response to the third-party server request. For example, in the case of a socket closure on the server-side, the network-side proxy 114 can respond with FIN/ACK, and prevent the server from attempting retries.

The traffic management policy manager 408 may also manage policies for coordinating, scheduling or aligning incoming and outgoing traffic and transmission of such traffic to their respective destinations. In one implementation, the traffic management policy manager 408 may implement a policy whereby both the local proxy 175 and the network-side proxy 114 delay or gate all the traffic during the same time period. When a trigger (e.g., based on a timer) is detected, network-side proxy 114 can promote the radio state of the mobile device to connected, and transfer the incoming traffic to the mobile device. Similarly, the local proxy 175 on the mobile device can take advantage of the radio state promotion from the network-side to transfer the outgoing traffic to the respective third-party servers. In some implementations, the radio state can be promoted from the device side due to other reasons (e.g., user initiating a request, backlight turning on). When the network-side proxy 114 detects the radio state promotion, the network-side proxy 114 can batch and transfer all the delayed traffic to the mobile device. When the radio state is demoted, the network-side proxy 114 (or the local proxy 175) can restart the delay or gating timer to align the next set of incoming traffic.

FIG. 5A depicts a block diagram illustrating an example of server-side components, in certain embodiments of a distributed proxy and cache system residing on a host server 500 that manages traffic in a wireless network (or broadband network) for resource conservation, content caching, and/or traffic management. In some embodiments, the server-side proxy (or proxy server 125) can further categorize mobile traffic and/or deploy and/or implement policies such as traffic management and delivery policies based on device state, application behavior, content priority, user activity, and/or user expectations.

The host server 500 generally includes, for example, a network interface 508 and/or one or more repositories 512, 514, and 516. Note that server 500 may be any portable/mobile or non-portable device, server, cluster of computers and/or other types of processing units (e.g., any number of a machine shown in the example of FIG. 1B) able to receive or transmit signals to satisfy data requests over a network including any wired or wireless networks (e.g., WiFi, cellular, Bluetooth, etc.).

The network interface 508 can include networking module(s) or devices(s) that enable the server 500 to mediate data in a network with an entity that is external to the host server 500, through any known and/or convenient communications protocol supported by the host and the external entity. Specifically, the network interface 508 allows the server 500 to communicate with multiple devices including mobile phone devices 550 and/or one or more application servers/content providers 510.

The host server 500 can store information about connections (e.g., network characteristics, conditions, types of connections, etc.) with devices in the connection metadata repository 512. Additionally, any information about third party application or content providers can also be stored in the repository 512. The host server 500 can store information about devices (e.g., hardware capability, properties, device settings, device language, network capability, manufacturer, device model, OS, OS version, etc.) in the device information repository 514. Additionally, the host server 500 can store information about network providers and the various network service areas in the network service provider repository 516.

The communication enabled by network interface 508 allows for simultaneous connections (e.g., including cellular connections) with devices 550 and/or connections (e.g., including wired/wireless, HTTP, Internet connections, LAN, WiFi, etc.) with content servers/providers 510 to manage the traffic between devices 550 and content providers 510, for optimizing network resource utilization and/or to conserver power (battery) consumption on the serviced devices 550. The host server 500 can communicate with mobile devices 550 serviced by different network service providers and/or in the same/different network service areas. The host server 500 can operate and is compatible with devices 550 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 5G (IMT-advanced), etc.

In general, the network interface 508 can include one or more of a network adaptor card, a wireless network interface card (e.g., SMS interface, WiFi interface, interfaces for various generations of mobile communication standards including but not limited to 1G, 2G, 3G, 3.5G, 5G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 500 can further include server-side components of the distributed proxy and cache system which can include a proxy server 125 and a server cache 535. In some embodiments, the proxy server 125 can include an HTTP access engine 545, a caching policy manager 555, a proxy controller 565, a traffic shaping engine 375, a new data detector 547 and/or a connection manager 595.

The HTTP access engine 545 may further include a heartbeat manager 598; the proxy controller 565 may further include a data invalidator module 568; the traffic shaping engine 575 may further include a control protocol 576 and a batching module 577. Additional or less components/modules/engines can be included in the proxy server 125 and each illustrated component.

In the example of a device (e.g., mobile device 550) making an application or content request to an application server or content provider 510, the request may be intercepted and routed to the proxy server 525 which is coupled to the device 550 and the application server/content provider 510. Specifically, the proxy server is able to communicate with the local proxy (e.g., proxy 175 of the examples of FIG. 1C) of the mobile device 550, the local proxy forwards the data request to the proxy server 125 in some instances for further processing and, if needed, for transmission to the application server/content server 510 for a response to the data request.

In such a configuration, the host 500, or the proxy server 125 in the host server 500 can utilize intelligent information provided by the local proxy in adjusting its communication with the device in such a manner that optimizes use of network and device resources. For example, the proxy server 125 can identify characteristics of user activity on the device 550 to modify its communication frequency. The characteristics of user activity can be determined by, for example, the activity/behavior awareness module 566 in the proxy controller 565 via information collected by the local proxy on the device 550.

In some embodiments, communication frequency can be controlled by the connection manager 595 of the proxy server 125, for example, to adjust push frequency of content or updates to the device 550. For instance, push frequency can be decreased by the connection manager 595 when characteristics of the user activity indicate that the user is inactive. In some embodiments, when the characteristics of the user activity indicate that the user is subsequently active after a period of inactivity, the connection manager 595 can adjust the communication frequency with the device 550 to send data that was buffered as a result of decreased communication frequency to the device 550.

In addition, the proxy server 125 includes priority awareness of various requests, transactions, sessions, applications, and/or specific events. Such awareness can be determined by the local proxy on the device 550 and provided to the proxy server 125. The priority awareness module 567 of the proxy server 125 can generally assess the priority (e.g., including dine-criticality, time-sensitivity, etc.) of various events or applications; additionally, the priority awareness module 567 can track priorities determined by local proxies of devices 550.

In some embodiments, through priority awareness, the connection manager 595 can further modify communication frequency (e.g., use or radio as controlled by the radio controller 596) of the server 500 with the devices 550. For example, the server 500 can notify the device 550, thus requesting use of the radio if it is not already in use when data or updates of an importance/priority level which meets a criteria becomes available to be sent.

In some embodiments, the proxy server 125 can detect multiple occurrences of events (e.g., transactions, content, data received from server/provider 510) and allow the events to accumulate for batch transfer to device 550. Batch transfer can be cumulated and transfer of events can be delayed based on priority awareness and/or user activity/application behavior awareness as tracked by modules 567 and/or 566. For example, batch transfer of multiple events (of a lower priority) to the device 550 can be initiated by the batching module 577 when an event of a higher priority (meeting a threshold or criteria) is detected at the server 500. In addition, batch transfer from the server 500 can be triggered when the server receives data from the device 550, indicating that the device radio is already in use and is thus on. In some embodiments, the proxy server 125 can order the each messages/packets in a batch for transmission based on event/transaction priority such that higher priority content can be sent first in case connection is lost or the battery dies, etc.

In some embodiments, the server 500 caches data (e.g., as managed by the caching policy manager 555) such that communication frequency over a network (e.g., cellular network) with the device 550 can be modified (e.g., decreased). The data can be cached, for example, in the server cache 535 for subsequent retrieval or batch sending to the device 550 to potentially decrease the need to turn on the device 550 radio. The server cache 535 can be partially or wholly internal to the host server 500, although in the example of FIG. 5A it is shown as being external to the host 500. In some instances, the server cache 535 may be the same as and/or integrated in part or in whole with another cache managed by another entity (e.g., the optional caching proxy server 199 shown in the example of FIG. 1C), such as being managed by an application server/content provider 510, a network service provider, or another third party.

In some embodiments, content caching is performed locally on the device 550 with the assistance of host server 500. For example, proxy server 125 in the host server 500 can query the application server/provider 510 with requests and monitor changes in responses. When changed or new responses are detected (e.g., by the new data detector 547), the proxy server 125 can notify the mobile device 550 such that the local proxy on the device 550 can make the decision to invalidate (e.g., indicated as outdated) the relevant cache entries stored as any responses in its local cache. Alternatively, the data invalidator module 568 can automatically instruct the local proxy of the device 550 to invalidate certain cached data, based on received responses from the application server/provider 510. The cached data is marked as invalid, and can get replaced or deleted when new content is received from the content server 510.

Note that data change can be detected by the detector 547 in one or more ways. For example, the server/provider 510 can notify the host server 500 upon a change. The change can also be detected at the host server 500 in response to a direct poll of the source server/provider 510. In some instances, the proxy server 125 can in addition, pre-load the local cache on the device 550 with the new/updated data. This can be performed when the host server 500 detects that the radio on the mobile device is already in use, or when the server 500 has additional content/data to be sent to the device 550.

One or more the above mechanisms can be implemented simultaneously or adjusted/configured based on application (e.g., different policies for different servers/providers 510). In some instances, the source provider/server 510 may notify the host 500 for certain types of events (e.g., events meeting a priority threshold level). In addition, the provider/server 510 may be configured to notify the host 500 at specific time intervals, regardless of event priority.

In some embodiments, the proxy server 125 of the host 500 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 550 can instruct the proxy server 125 to perform such monitoring or the proxy server 125 can automatically initiate such a process upon receiving a certain number of the same responses (e.g., or a number of the same responses in a period of time) for a particular request.

In some embodiments, the server 500, through the activity/behavior awareness module 566, is able to identify or detect user activity at a device that is separate from the mobile device 550. For example, the module 566 may detect that a user's message inbox (e.g., email or types of inbox) is being accessed. This can indicate that the user is interacting with his/her application using a device other than the mobile device 550 and may not need frequent updates, if at all.

The server 500, in this instance, can thus decrease the frequency with which new or updated content is sent to the mobile device 550, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services) to the mobile device 550.

In some embodiments, the host server 500 is able to poll content sources 510 on behalf of devices 550 to conserve power or battery consumption on devices 550. For example, certain applications on the mobile device 550 can poll its respective server 510 in a predictable recurring fashion. Such recurrence or other types of application behaviors can be tracked by the activity/behavior module 566 in the proxy controller 565. The host server 500 can thus poll content sources 510 for applications on the mobile device 550 that would otherwise be performed by the device 550 through a wireless (e.g., including cellular connectivity). The host server can poll the sources 510 for new or changed data by way of the HTTP access engine 545 to establish HTTP connection or by way of radio controller 596 to connect to the source 510 over the cellular network. When new or changed data is detected, the new data detector 547 can notify the device 550 that such data is available and/or provide the new/changed data to the device 550.

In some embodiments, the connection manager 595 determines that the mobile device 550 is unavailable (e.g., the radio is turned off) and utilizes SMS to transmit content to the device 550, for instance, via the SMSC shown in the example of FIG. 1C. SMS is used to transmit invalidation messages, batches of invalidation messages, or even content in the case where the content is small enough to fit into just a few (usually one or two) SMS messages. This avoids the need to access the radio channel to send overhead information. The host server 500 can use SMS for certain transactions or responses having a priority level above a threshold or otherwise meeting a criteria. The server 500 can also utilize SMS as an out-of-band trigger to maintain or wake-up an IP connection as an alternative to maintaining an always-on IP connection.

In some embodiments, the connection manager 595 in the proxy server 125 (e.g., the heartbeat manager 598) can generate and/or transmit heartbeat messages on behalf of connected devices 550 to maintain a backend connection with a provider 510 for applications running on devices 550.

For example, in the distributed proxy system, local cache on the device 550 can prevent any or all heartbeat messages needed to maintain TCP/IP connections required for applications from being sent over the cellular, or other, network and instead rely on the proxy server 125 on the host server 500 to generate and/or send the heartbeat messages to maintain a connection with the backend (e.g., application server/provider 110 in the example of FIG. 1B). The proxy server can generate the keep-alive (heartbeat) messages independent of the operations of the local proxy on the mobile device.

The repositories 512, 514, and/or 516 can additionally store software, descriptive data, images, system information, drivers, and/or any other data item utilized by other components of the host server 500 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

FIG. 5B depicts a block diagram illustrating a further example of components in a caching policy manager 555 in the distributed proxy and cache system shown in the example of FIG. 5A which is capable of caching and adapting caching strategies for mobile application behavior and/or network conditions.

The caching policy manager 555, In some embodiments, can further include a metadata generator 503, a cache look-up engine 505, an application protocol module 556, a content source monitoring engine 557 having a poll schedule manager 558, a response analyzer 561, and/or an updated or new content detector 559. In some embodiments, the poll schedule manager 558 further includes a host timing simulator 558a, a long poll request detector/manager 558b, a schedule update engine 558c, and/or a time adjustment engine 558d. The metadata generator 503 and/or the cache look-up engine 505 can be coupled to the cache 535 (or, server cache) for modification or addition to cache entries or querying thereof.

In some embodiments, the proxy server (e.g., the proxy server 125 of the examples of FIGS. 1B-1C and FIG. 5A) can monitor a content source for new or changed data via the monitoring engine 557. The proxy server, as shown, is an entity external to the mobile device 250 of FIGS. 2A-2C and external to the network-side proxy 114 of FIG. 4. The content source (e.g., application server/content provider 110 of FIG. 1B-1C) can be one that has been identified to the proxy server (e.g., by the local proxy) as having content that is being locally cached on a mobile device (e.g., mobile device 150 or 250). The content source can be monitored, for example, by the monitoring engine 557 at a frequency that is based on polling frequency of the content source at the mobile device. The poll schedule can be generated, for example, by the local proxy and sent to the proxy server. The poll frequency can be tracked and/or managed by the poll schedule manager 558.

For example, the proxy server can poll the host (e.g., content provider/application server) on behalf of the mobile device and simulate the polling behavior of the client to the host via the host timing simulator 558a. The polling behavior can be simulated to include characteristics of a long poll request-response sequences experienced in a persistent connection with the host (e.g., by the long poll request detector/manager 558b). Note that once a polling interval/behavior is set, the local proxy 175 on the device-side and/or the proxy server 125 on the server-side can verify whether application and application server/content host behavior match or can be represented by this predicted pattern. In general, the local proxy and/or the proxy server can detect deviations and, when appropriate, re-evaluate and compute, determine, or estimate another polling interval.

In some embodiments, the caching policy manager 555 on the server-side of the distribute proxy can, in conjunction with or independent of the proxy server 175 on the mobile device, identify or detect long poll requests. For example, the caching policy manager 555 can determine a threshold value to be used in comparison with a response delay interval time in a request-response sequence for an application request to identify or detect long poll requests, possible long poll requests (e.g., requests for a persistent connection with a host with which the client communicates including, but not limited to, a long-held HTTP request, a persistent connection enabling COMET style push, request for HTTP streaming, etc.), or other requests which can otherwise be treated as a long poll request.

For example, the threshold value can be determined by the proxy 125 using response delay interval times for requests generated by clients/applications across mobile devices which may be serviced by multiple different cellular or wireless networks. Since the proxy 125 resides on host 500 is able to communicate with multiple mobile devices via multiple networks, the caching policy manager 555 has access to application/client information at a global level which can be used in setting threshold values to categorize and detect long polls.

By tracking response delay interval times across applications across devices over different or same networks, the caching policy manager 555 can set one or more threshold values to be used in comparison with response delay interval times for long poll detection. Threshold values set by the proxy server 125 can be static or dynamic, and can be associated with conditions and/or a time-to-live (an expiration time/date in relative or absolute terms).

In addition, the caching policy manager 555 of the proxy 125 can further determine the threshold value, in whole or in part, based on network delays of a given wireless network, networks serviced by a given carrier (service provider), or multiple wireless networks. The proxy 125 can also determine the threshold value for identification of long poll requests based on delays of one or more application server/content provider (e.g., 110) to which application (e.g., mobile application) or mobile client requests are directed.

The proxy server can detect new or changed data at a monitored content source and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 555) upon detecting new or changed data can also store the new or changed data in its cache (e.g., the server cache 135 of the examples of FIG. 1C). The new/updated data stored in the server cache 535 can be used in some instances to satisfy content requests at the mobile device; for example, it can be used after the proxy server has notified the mobile device of the new/changed content and that the locally cached content has been invalidated.

The metadata generator 503 can generate metadata for responses cached for requests at the mobile device 250. The metadata generator 503 can generate metadata for cache entries stored in the server cache 535. Similarly, the cache lookup engine 505 can include the same or similar functions are those described for the cache look-up engine 205 shown in the example of FIG. 5B.

The response analyzer 561 can perform any or all of the functionalities related to analyzing responses received for requests generated at the mobile device 250 in the same or similar fashion to the response analyzer 246d of the local proxy shown in the example of FIG. 5B. Since the proxy server 125 is able to receive responses from the application server/content source 510 directed to the mobile device 250, the proxy server 125 (e.g., the response analyzer 561) can perform similar response analysis steps to determine cacheability, as described for the response analyzer of the local proxy. The responses can be analyzed in addition to or in lieu of the analysis that can be performed at the local proxy 175 on the mobile device 250.

Furthermore, the schedule update engine 558c can update the polling interval of a given application server/content host based on application request interval changes of the application at the mobile device 250 as described for the schedule update engine in the local proxy 175. The time adjustment engine 558d can set an initial time at which polls of the application server/content host is to begin to prevent the serving of out of date content once again before serving fresh content as described for the schedule update engine in the local proxy 175. Both the schedule updating and the time adjustment algorithms can be performed in conjunction with or in lieu of the similar processes performed at the local proxy 175 on the mobile device 250.

FIG. 5C depicts a block diagram illustrating examples of additional components in certain embodiments in a proxy server 125 shown in the example of FIG. 5A which is further capable of performing mobile traffic categorization and policy implementation based on application behavior and/or traffic priority to enhance mobile traffic management and resource conservation in a mobile network.

In some embodiments of the proxy server 125, the traffic shaping engine 575 is further coupled to a traffic analyzer 536 for categorizing mobile traffic for policy definition and implementation for mobile traffic and transactions directed to one or more mobile devices (e.g., mobile device 250 of FIGS. 2A-2C) or to an application server/content host (e.g., 110 of FIGS. 1B-1C). In general, the proxy server 125 is remote from the mobile devices and remote from the host server, as shown in the examples of FIGS. 1B-1C. The proxy server 125 or the host server 500 can monitor the traffic for multiple mobile devices and is capable of categorizing traffic and devising traffic policies for different mobile devices.

In addition, the proxy server 125 or host server 500 can operate with multiple carriers or network operators and can implement carrier-specific policies relating to categorization of traffic and implementation of traffic policies for the various categories. For example, the traffic analyzer 536 of the proxy server 125 or host server 500 can include one or more of a prioritization engine 541a, a time criticality detection engine 541b, an application state categorizer 541c, and/or an application traffic categorizer 541d.

Each of these engines or modules can track different criterion for what is considered priority, time critical, background/foreground, or interactive/maintenance based on different wireless carriers. Different criterion may also exist for different mobile device types (e.g., device model, manufacturer, operating system, etc.). In some instances, the user of the mobile devices can adjust the settings or criterion regarding traffic category and the proxy server 125 is able to track and implement these user adjusted/configured settings.

In some embodiments, the traffic analyzer 536 is able to detect, determined, identify, or infer, the activity state of an application on one or more mobile devices (e.g., mobile device 150 or 250) which traffic has originated from or is directed to, for example, via the application state categorizer 541c and/or the traffic categorizer 541d. The activity state can be determined based on whether the application is in a foreground or background state on one or more of the mobile devices (via the application state categorizer 541c) since the traffic for a foreground application vs. a background application may be handled differently to optimize network use.

In the alternate or in combination, the activity state of an application can be determined by the wirelessly connected mobile devices (e.g., via the application behavior detectors in the local proxies) and communicated to the proxy server 125. For example, the activity state can be determined, detected, identified, or inferred with a level of certainty of heuristics, based on the backlight status at mobile devices (e.g., by a backlight detector) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

The activity state can be determined from assessing, determining, evaluating, inferring, identifying user activity at the mobile device 250 (e.g., via the user activity module 215) and communicated to the proxy server 125. In some embodiments, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

The time criticality detection engine 541b can generally determine, identify, infer the time sensitivity of data contained in traffic sent from the mobile device 250 or to the mobile device from the host server 500 or proxy server 125, or the application server (e.g., app server/content source 110). For example, time sensitive data can include, status updates, stock information updates, IM presence information, email messages or other messages, actions generated from mobile gaming applications, webpage requests, location updates, etc.

Data that is not time sensitive or time critical, by nature of the content or request, can include requests to delete messages, mark-as-read or edited actions, application-specific actions such as an add-friend or delete-friend request, certain types of messages, or other information which does not frequently changing by nature, etc. In some instances when the data is not time critical, the timing with which to allow the traffic to be sent to a mobile device is based on when there is additional data that needs to the sent to the same mobile device. For example, traffic shaping engine 575 can align the traffic with one or more subsequent transactions to be sent together in a single power-on event of the mobile device radio (e.g., using the alignment module 578 and/or the batching module 577). The alignment module 578 can also align polling requests occurring close in time directed to the same host server, since these request are likely to be responded to with the same data.

In general, whether new or changed data is sent from a host server to a mobile device can be determined based on whether an application on the mobile device to which the new or changed data is relevant, is running in a foreground (e.g., by the application state categorizer 541c), or the priority or time criticality of the new or changed data. The proxy server 125 can send the new or changed data to the mobile device if the application is in the foreground on the mobile device, or if the application is in the foreground and in an active state interacting with a user on the mobile device, and/or whether a user is waiting for a response that would be provided in the new or changed data. The proxy server 125 (or traffic shaping engine 575) can send the new or changed data that is of a high priority or is time critical.

Similarly, the proxy server 125 (or the traffic shaping engine 575) can suppressing the sending of the new or changed data if the application is in the background on the mobile device. The proxy server 125 can also suppress the sending of the new or changed data if the user is not waiting for the response provided in the new or changed data; wherein the suppressing is performed by a proxy server coupled to the host server and able to wirelessly connect to the mobile device.

In general, if data, including new or change data is of a low priority or is not time critical, the proxy server can waiting to transfer the data until after a time period, or until there is additional data to be sent (e.g., via the alignment module 578 and/or the batching module 577).

FIG. 6A-1 illustrates an example alignment of HTTP requests based on a variable gating delay and a TCP payload delay state machine depicted in FIG. 6A-2.

The connect and read timeouts for HTTP requests are modified to large values (e.g., via system timer modification module 280). The modified connect and read timeouts for an HTTP request are then passed on to the TCP stack as TCP socket's connect and read timeouts, allowing an HTTP-based application 602 to have a large timeout or delay tolerance 606. As illustrated, the HTTP-based application 602 can send an HTTP request 608, which is intercepted by the client-side proxy 175. At the client-side proxy 175, a variable gating delay 610 can be determined and/or applied, during which the HTTP request 608 from the application 602, and any other HTTP requests from other applications on the mobile device can be delayed or gated for alignment with a radio event, for example. When the radio is turned on due to other reasons (e.g., mobile device screen turns on, or user-interactive traffic is detected) or when the delay time period 610 is expired, the requests that are delayed or gated are allowed to the network to respective third-party servers such as the third-party application server 604 (e.g., Google.com, YouTube.com). The third-party servers can then return HTTP responses 612, which can be sent to the respective applications via the client-side proxy 175. As illustrated in FIG. 6A-1, one of the HTTP responses 612 that is associated with the HTTP request 608 is transferred to the HTTP based application, before the timer for the HTTP protocol 606 times out.

A TCP state machine illustrated in FIG. 6A-2 is used to delay the TCP connect and payload associated with the HTTP request 608. As illustrated, the first state of the state machine is the TCP LISTEN state 620, where the client-side proxy 175 listens or waits for connection requests from an HTTP-based application. When a TCP connect request and payload are received, the TCP LISTEN state changes to TCP PAYLOAD GATING DELAY state 624. In the TCP PAYLOAD GATING DELAY state 624, TCP connect requests and payloads are queued and delayed, until a variable gating delay trigger 626 is received. The TCP PAYLOAD GATING DELAY state 624 then transitions to TCP RELAY state 630. During the TCP RELAY STATE 630, TCP connection(s) can be established and TCP data packets can be used by the HTTP protocol to send HTTP requests (e.g., GET requests) to respective application servers. After the last of the HTTP requests are sent, the TCP RELAY state 630 transitions to TCP END SESSION state 632.

Figures 1, 2, 6B:
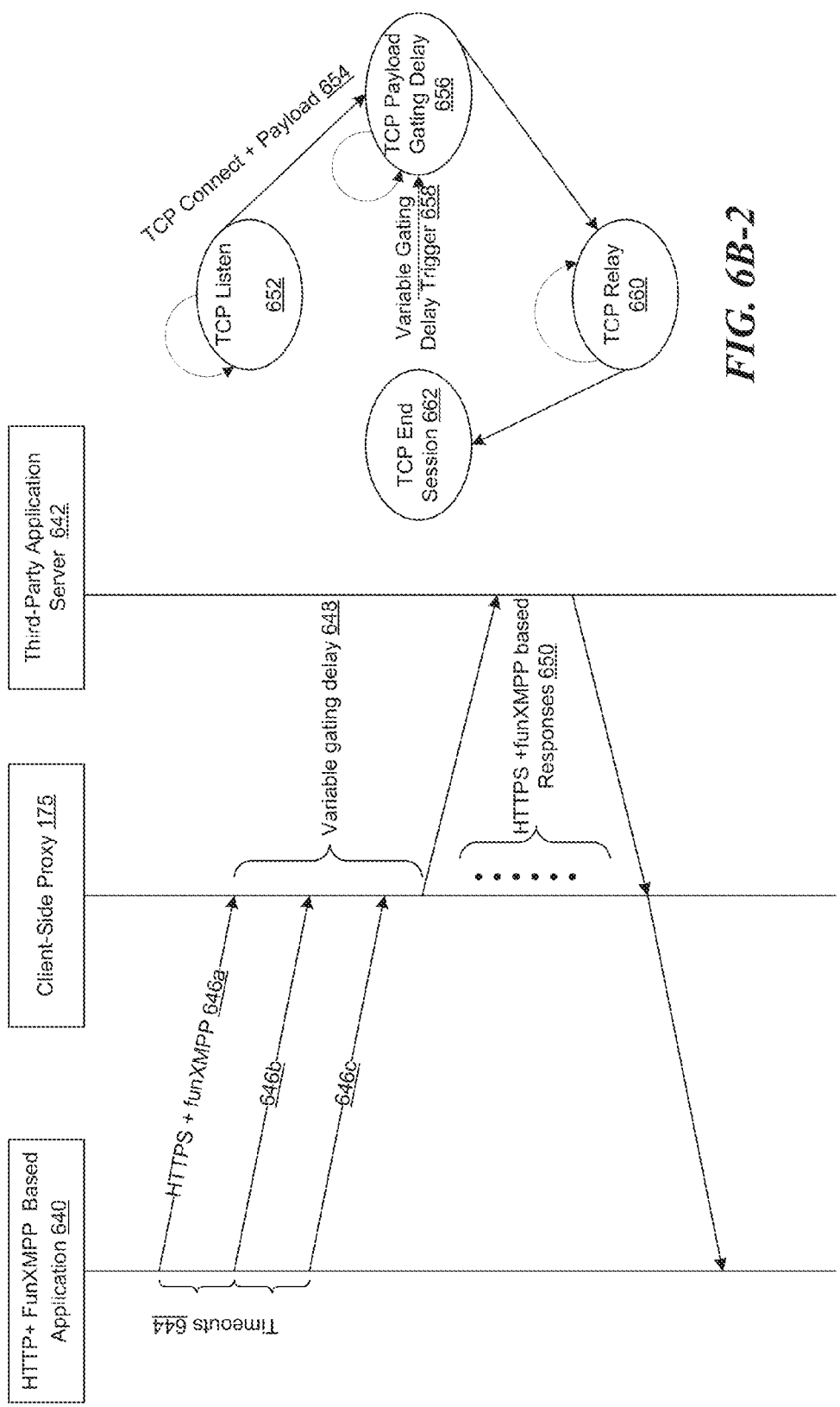

FIG. 6B-1 illustrates an example alignment of HTTPS and FunXMPP requests based on a variable gating delay and a TCP payload delay state machine depicted in FIG. 6B-2. In this example, applications 640 on a mobile device utilize HTTPS and FunXMPP protocols to communicate with its application server or third-party server 642.

HTTPS and FunXMPP protocol-specific timers can be modified to larger values using framework wrappers (e.g., via system timer modification module 280). As illustrated, the timers associated with the HTTPS and FunXMPP protocols are modified to have, for example, 10, 20, 30, 40, 50, 60 seconds or other timeouts 644. By way of example, a delay value for the connect timeout for a request can be determined from an analysis of an application associated with the request or from one or more applications based on the same protocol as the request. Requests 646*a-c* from an HTTPS and FunXMPP based application can be intercepted by the client-side proxy 175 and a variable gating delay 648 can be applied to delay and clump or bundle the requests 646*a-c*.

When the time period as defined by the variable gating delay is expired or when a radio on the mobile device is powered on or promoted, the clumped or bundled requests, including requests 646*a-c*, are transferred over a TCP connection to application servers such as the third-party server 642. The HTTPS and FunXMPP based responses 650 are received from the third-party servers by the client-side proxy and then forwarded on the respective applications.

The TCP state machine illustrated in FIG. 6B-2 depicts transitions from one state to another in the process of delaying TCP connection establishment and data transfer. During the TCP LISTEN state 652, the client-side proxy 652 listens or waits for connection requests from any HTTPS and FunXMPP based applications. When requests to establish a TCP connection and transfer payload is received, the TCP LISTEN state 652 transitions to the TCP PAYLOAD GATING DELAY state 656 where the TCP connection and transfer payload requests can be delayed for a duration, based on the delay tolerance of the application. When a variable gating delay trigger is received or detected, the TCP PAYLOAD GATING DELAY state 656 changes to the TCP RELAY state 660. While in the TCP RELAY state 660, a TCP connection is established, and the delayed payload can be transferred to the respective third-party application servers. When the responses are received, the TCP state can be changed to the TCP END SESSION state 662.

Figure 7A:
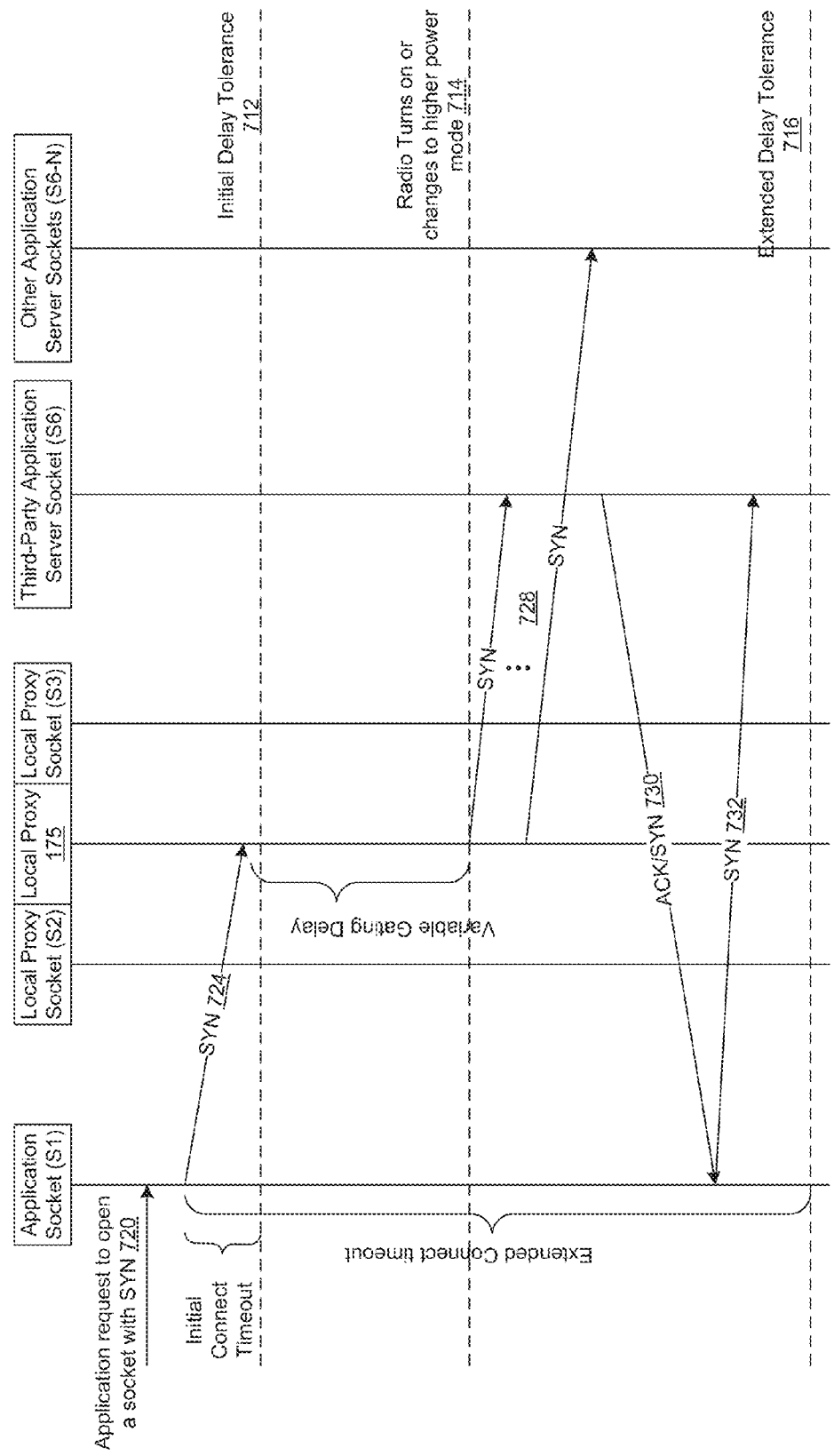
FIG. 7A illustrates an example sequence diagram depicting a procedure for delaying socket establishment until a radio event.

FIG. 7A illustrates an example sequence diagram depicting a procedure for delaying socket establishment until a radio state promotion event. An application can request to open a socket with a TCP synchronize (SYN) packet. As illustrated, an application socket S1 has an initial connect timeout that defines the application's initial delay tolerance 712. The initial connect timeout is modified to obtain an extended connect timeout that defines the extended delay tolerance 716. The SYN packet from the socket S1 is received by the local proxy 175 via socket S2. The local proxy 175 applies a variable gating delay 726 to delay the socket from being established. The variable gating delay can be determined based on various factors. For example, the variable gating delay can be determined based on a predefined limit, can be configured and/or reconfigured on the fly, can be determined based on radio state promotions caused by other reasons (e.g., detection of high priority or time critical traffic), data stream considered to be user-interactive (e.g., screen turning on), one or more policies (e.g., agreed interval between the local proxy 175 and a network-side proxy 114 on the carrier network), and the like.

In the illustrated example, a radio state promotion event 714 triggers the local proxy 175 to transfer the application requests to establish a TCP connection with third-party application servers (e.g., sockets S6-N). The delayed SYN packet 728 (from socket S1) is allowed to go out to the network, and establish a TCP connection via a three way handshake procedure which involves sending a SYN packet, receiving SYN+ACK packets 730 and returning a SYN packet 732 to the third-party application server socket S6. Following establishment of a TCP connection, TCP payload can be transferred and on completion of the transfer, the TCP connection can be closed.

Figure 7B:
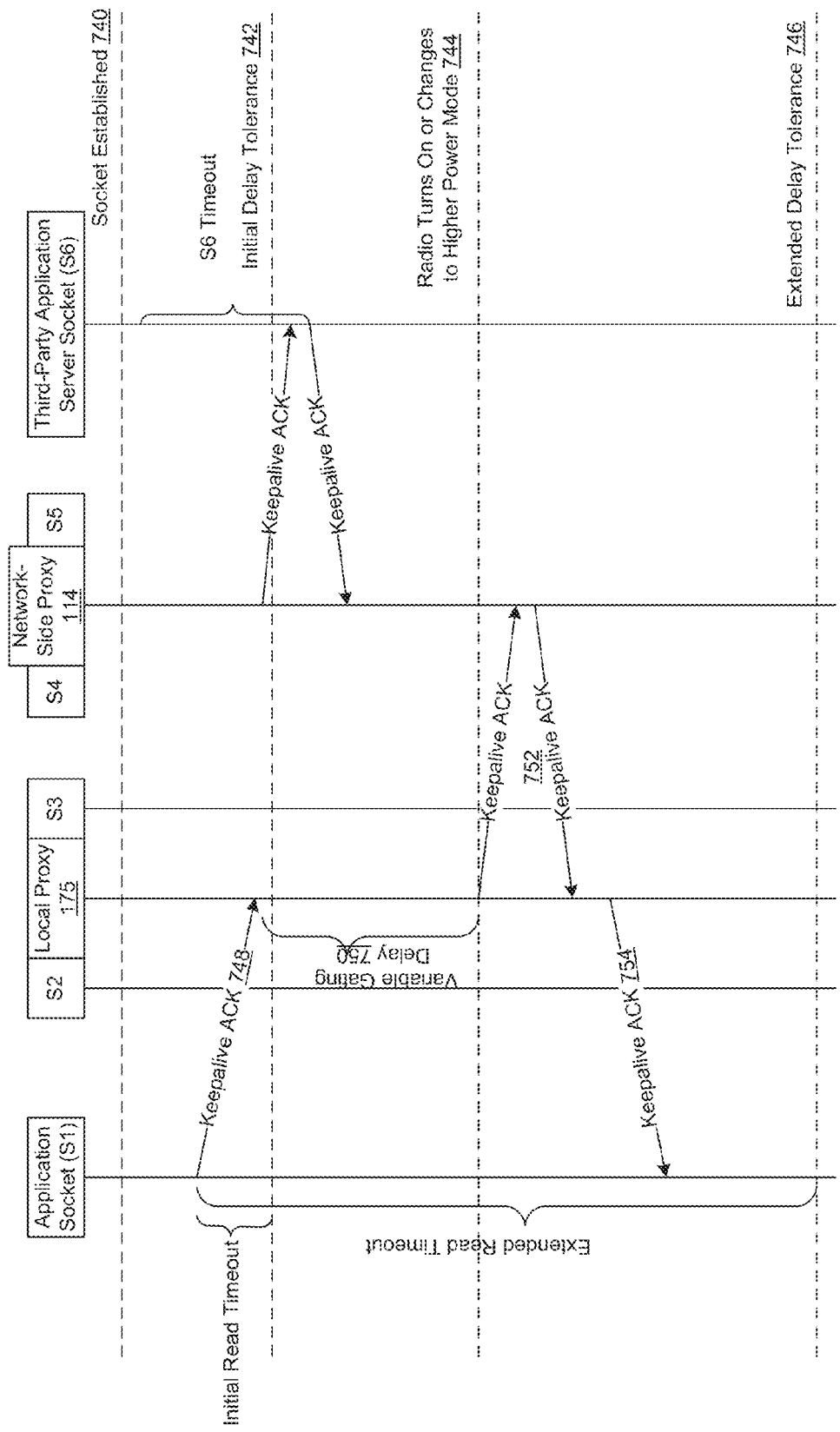
FIG. 7B illustrates an example sequence diagram depicting a procedure for delaying reading from an established socket until a radio event.

FIG. 7B illustrates an example sequence diagram depicting a procedure for delaying reading from an established socket until a radio on a mobile device is turned on or promoted from a low power state to a high power state. As an example, YahooMail application can send keepalives every 15 minutes on port 8996. When the application socket S1's timeout is modified, the application has an extended delay tolerance 746, instead of the initial delay tolerance 742. The extended delay tolerance allows the local proxy 175 to intercept a keepalive acknowledgement packet (ACK) 748 and prevent the ACK 748 from going to the network. However, at the other side of the connection, a third-party application server's socket S6 can time out, and can close inactive socket to save resources. In the example of the YahooMail application, the YahooMail server can time out and close the socket S6 if an ACK is not received within 2 minutes (or other grace period, depending on the specific application server) from the expected time (i.e., 15 minutes). In other words, if the socket S6 of the YahooMail server is inactive for 17 minutes, the socket S6 can timeout, and the TCP connection can be closed by the YahooMail server. To keep both the connection between YahooMail server and the YahooMail application alive (or healthy or active), a socket S5 of a network-side proxy 114 in the carrier network can exchange keepalive ACKs 756 with the socket S6 to keep the socket S6 from timing out. Meanwhile, the keepalive ACK 748 is delayed or even blocked based on a variable gating delay 750 without having the socket S1 timeout. When a radio state promotion event (e.g., radio state changing from idle state to connected state or radio state changing from a lower power state to a high power state) trigger 744 is detected, the keepalive ACKs 752 are exchanged with the network-side proxy 114 and a keepalive ACK can be returned on the socket S1. Alternately, if the keepalive ACK is blocked, a keepalive exchange need not occur, and only the keepalive ACK sent from the network-side proxy can be received at the socket S1. This allows the keepalive ACKs to be delayed as long as necessary to achieve radio alignment at the client-side, while keeping the server-side in an unaware state. Since the server-side is unaware, the delaying prevents S6 from terminating the connection (e.g., by sending FIN packet), attempting to reconnect, etc., which can cause additional signaling in the mobile network.

Figure 8A:
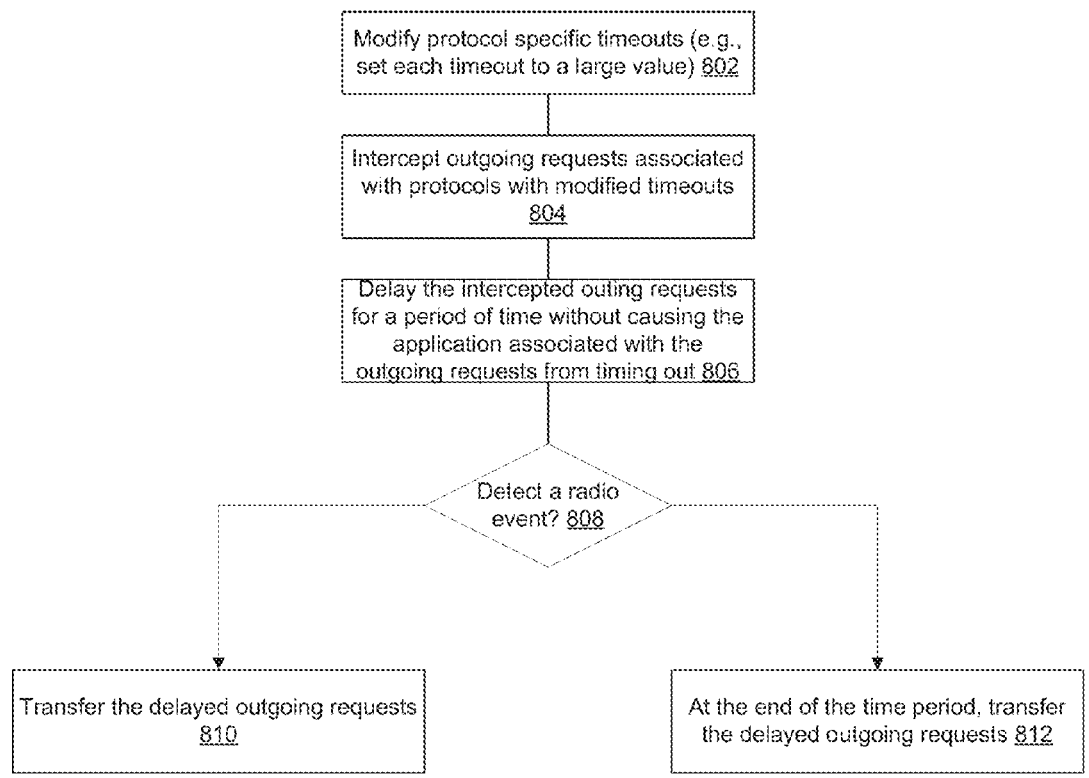
FIGS. 8A-8C illustrate example methods of optimizing traffic management in a mobile device

FIG. 8A illustrates an example method of optimizing traffic management in a mobile device. In some embodiments, framework wrappers or plugins can be used to modify protocol specific timeouts to extend delay tolerance of applications that rely on such protocols at block 802. For example, HTTP timers associated with HTTP based applications can have their initial or default values overwritten with new values. For example, the timers can be set to infinity, or at least to larger values, including values that are orders of magnitude greater. Similarly, XMPP based applications or HTTPS based applications can have their initial values overwritten with new values that are larger than the initial or default values. At block 804, the local proxy 175 can intercept application requests initiating from multiple applications that are associated with protocols having the modified timeouts (e.g., HTTP, HTTPS, XMPP). At block 806, the intercepted application requests are delayed for a period of time. The period of time can be a function of a variable gating delay, which can be determined based on the extended delay tolerance, radio turning on or changing to high power state for other reasons and/or receiving of an application request that constitutes a user-interactive traffic. When no radio event is detected at decision block 808, at the end of the period of time, a radio connection can be established and the delayed application requests can be batched and sent to the network at block 810. Conversely, the delayed application requests can be batched and sent to the network at block 810, when a radio is activated or promoted or other events such as screen turn on event occur that activate the radio is detected at decision block 808. For example, HTTP-based applications may have a modified delay tolerance of 10 minutes. In the absence of other triggers, such as a radio turn on event, radio state change from low power to high power or screen on event, HTTP based requests may be delayed for almost 10 minutes. However, when a radio turn event occurs before the 10 minute delay period ends, the HTTP-based requests can be transferred using the radio connection.

Figure 8B:
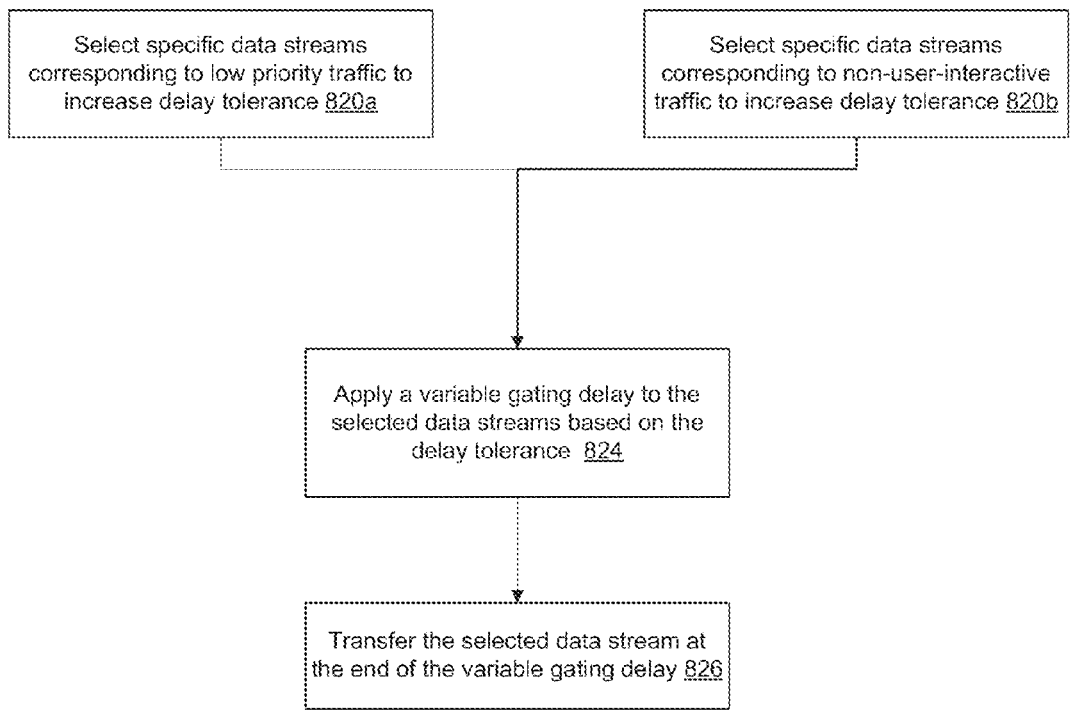

FIG. 8B illustrates an example method of optimizing traffic management in a mobile device. At block 820a, specific data streams corresponding to low priority or non-time critical traffic can be selected to increase the delay tolerance. At block 820b, specific data streams corresponding to non-user-interactive traffic can be selected to increase the delay tolerance. Before the selected data streams reach the TCP stack, the TCP timer values are overwritten with new values that are much larger than the initial values. The applications from where the data streams originate remain unaware of the modification, and the TCP stack can use the new timeout values in reading/writing from/to sockets. At block 822, the local proxy 175 on the mobile device can apply a variable gating delay based on a predefined limit (e.g., the modified timeout or delay tolerance), radio being activated or changed to high power mode for other reasons, or one of the data streams being considered user-interactive (e.g., screen turning on). At block 824, based on the gating delay, the data streams can be transferred to respective application servers.

Figure 8C:
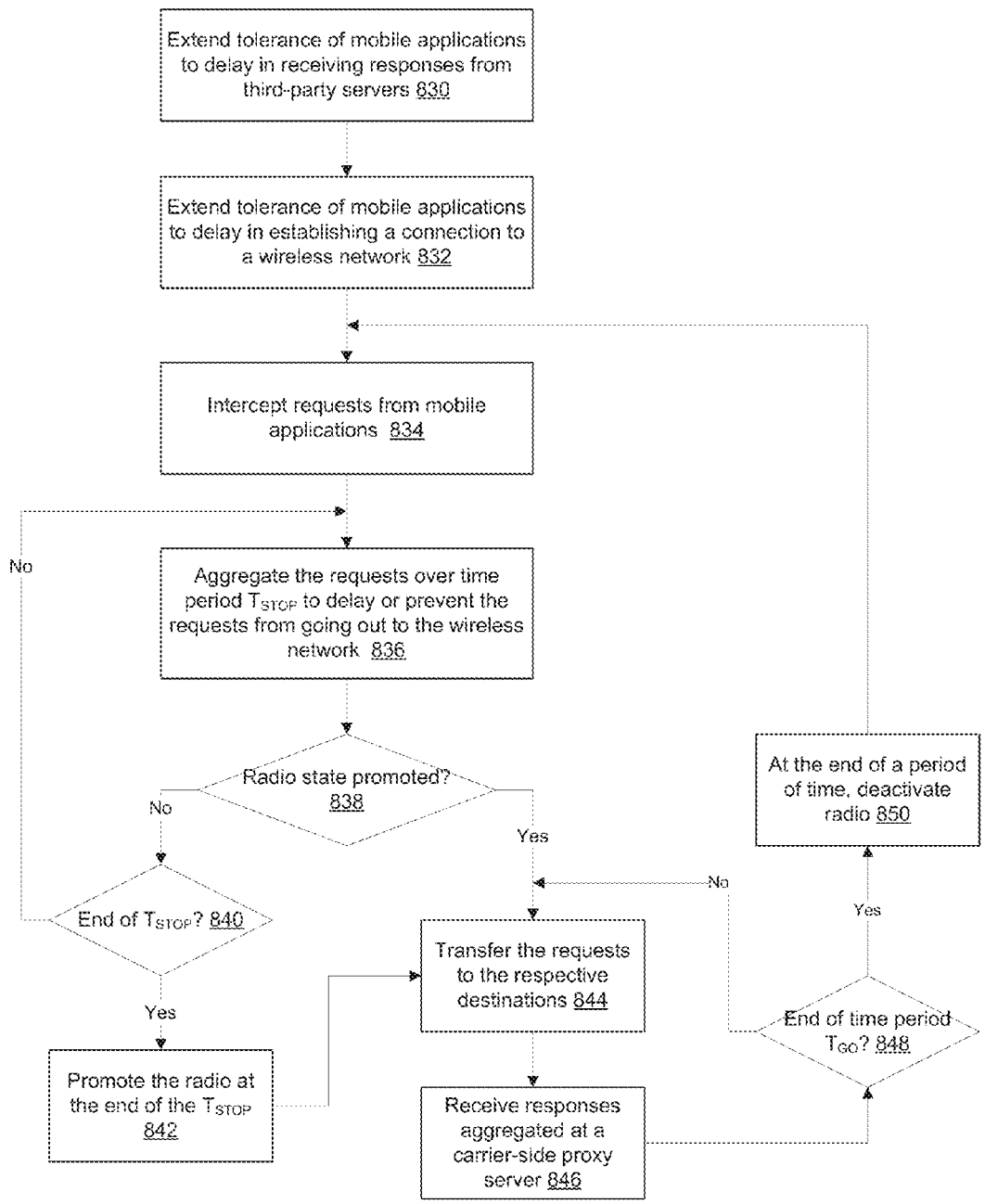

FIG. 8C illustrates an example method of optimizing traffic management in at mobile device to align receiving and sending of requests/responses to minimize the number of connections established. At block 830, the tolerance of mobile applications to delay in receiving responses from one or more application severs is extended. At block 832, the tolerance of mobile applications to delay in sending requests to one or more application servers is extended. These tolerance to delay can be extended by modifying system timers, including network stack timers and/or protocol-specific timers (e.g., via system timer modification module 280). For example, delay tolerance of applications that rely on protocol-specific timers can be extended by overwriting timeouts for the protocols associated with those applications. Similarly, delay tolerance of applications that rely on TCP stack timers can be extended by overwriting TCP read and connect timeouts.

At block 834, requests from the mobile applications are intercepted (e.g., via request/transaction manager 235). Requests may need to meet criteria to be intercepted in some instances. For example, non-user interactive requests or background requests may be intercepted and delayed, while user interactive requests may not be. Similarly, low priority requests (even if they are a result of user interaction) can be intercepted and delayed, while high priority requests may not be. Similarly, some mobile applications may be included in a list for traffic management, and requests from those mobile applications may be intercepted, while requests from other mobile applications not in the list may not be intercepted. At block 836, the requests are aggregated over a period of time ($T_{STOP}$) to delay the requests or prevent the requests from establishing a connection to the wireless network (e.g., via traffic shaping engine 255). At block 838, if a radio on the mobile device is not activated or powered on, and the $T_{STOP}$ period is not over as determined at decision block 840, requests continue to aggregate. When the $T_{STOP}$ period ends, the radio on the mobile device is activated (e.g., via connection manager 265), signaling the end of the aggregation period and beginning of the transfer period $T_{GO}$. The aggregated requests are then transferred to their respective destinations at block 844. Alternately, at block 838, if the radio is activated or caused to be promoted to high power mode, before the end of the $T_{STOP}$ period, the aggregated requests are transferred to the respective destinations at block 844. At block 846, while the radio is activated, responses aggregated at a carrier-side proxy server 114 and/or requests/responses from one or more application servers are received at the mobile device. Use of the single radio connection to transfer multiple requests to the network and/or receive multiple requests/responses from remote servers reduces signaling and power consumption involved each time a radio connection is established and torn down.

At decision block 848, when the $T_{GO}$ period ends, the transmission and receiving is halted by deactivating or powering down the radio at block 850. Until the time period TGO ends, the radio remains activated and transfer of the requests and receiving of responses can continue.

FIG. 9 depicts a table 900 showing examples of different traffic or application category types which can be used enhancing mobile traffic management. For example, traffic/application categories can include interactive or background, whether a user is waiting for the response, foreground/background application, and whether the backlight is on or off.

FIG. 10 depicts a table 1000 showing examples of different content category types which can be used for enhancing mobile traffic management. For example, content category types can include content of high or low priority, and time critical or non-time critical content/data.

Figure 11:
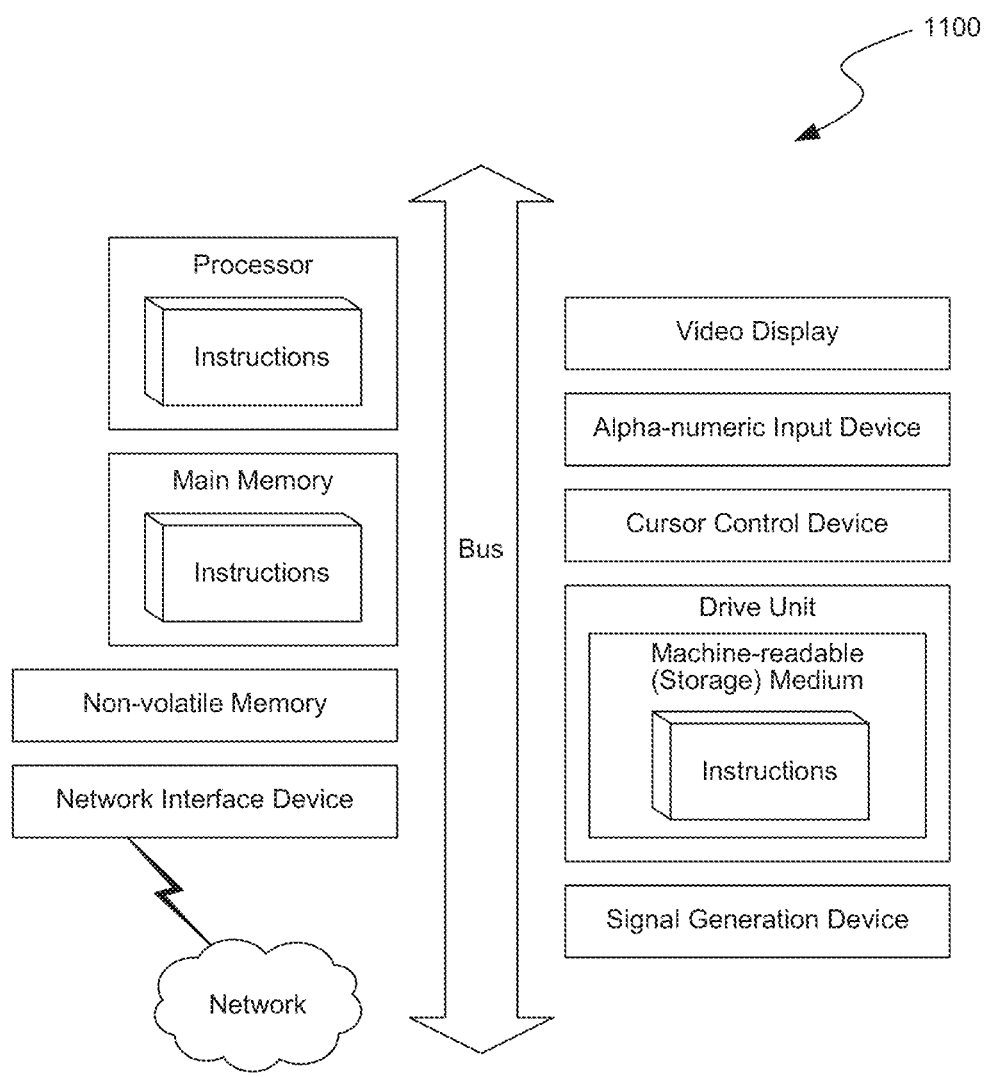
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In the example of FIG. 11, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIGS. 2A-2C, 4 and 5A-5C (and any other components described in this specification) can be implemented. The computer system 1000 can be of any applicable known or convenient type. The components of the computer system 1000 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for managing mobile traffic in a mobile device, comprising:
on a mobile device having a memory and a processor, the mobile device having mobile applications each having an initial timeout:
extending, by the processor, tolerance of mobile applications on the mobile device to delay in establishing a connection to a wireless network, wherein extending the tolerance of the mobile applications to delay includes modifying one or more system functions, wherein the system function includes an ability to access the wireless network for the mobile applications, and
wherein the mobile device is further configured, by the processor, to determine:
a first tolerance based on receipt of a message over a wireless radio directed to one of the applications;
a second tolerance based on detection of a screen on the mobile device being turned on; and
a third tolerance that is a predetermined value;
and wherein the mobile device is configured, by the processor, to select a shorter of the first, second, and third tolerances;
based on the tolerance that is extended, batching, by the processor, over a period of time, requests from the mobile applications such that transfer of the requests during the period of time is delayed,
wherein the tolerance that is extended includes:
the first tolerance when the first tolerance is shorter than the second tolerance and the third tolerance;
the second tolerance when the second tolerance is shorter than the first tolerance and the third tolerance
the third tolerance when the third tolerance is shorter than the first tolerance and the second tolerance;
determining, by the processor, connection timeouts to extend the tolerance of the mobile applications to delay.

2. The method of claim 1, wherein the transfer of the requests during the period of time is delayed without the mobile applications being aware.

3. The method of claim 1, wherein extending the tolerance of the mobile applications to delay further comprises increasing connection timeouts associated with system timers on which the mobile applications rely when establishing a connection to the wireless network.

4. The method of claim 3, wherein the system timers include protocol-specific timers or network stack timers.

5. The method of claim 4, wherein the connection timeouts associated with the protocol-specific timers are modified by a framework wrapper in the mobile device.

6. The method of claim 4, wherein the protocol-specific timers are associated with a protocol over which the mobile applications communicate.

7. The method of claim 6, wherein the protocol includes Hyper Text Transfer Protocol (HTTP), Hyper Text Transfer Protocol Secure (HTTPS) or Extensible Messaging and Presence Protocol (XMPP).

8. The method of claim 1, wherein the period of time over which the requests are batched is variable.

9. The method of claim 1, wherein the period of time over which the requests are batched is one of: a maximum period of time defined by a gating parameter or the maximum period of time adjusted by an occurrence of an event that causes a radio on the mobile device to turn on or change from low power mode to high power mode.

10. The method of claim 1, wherein the period of time is dynamically determined based on a policy.

11. The method of claim 1, further comprising:
responsive to establishment of a connection to the wireless network at an end of the period of time, transferring the requests batched over the period of time over the wireless network to respective servers to which the requests are directed.

12. The method of claim 11, further comprising:
receiving responses to at least some of the requests from respective servers;
providing the responses to respective mobile applications, such that time elapsed between issuing of the requests and receiving of the responses is within the tolerance of the mobile applications to delay that is extended.

13. The method of claim 1, wherein a local proxy on the mobile device aggregates the requests from the mobile applications over the period of time.

14. The method of claim 1, wherein a local proxy on the mobile device provides connection timeouts to the mobile applications to extend the tolerance of the mobile applications to delay.

15. The method of claim 1, wherein the requests are non-user interactive traffic from the mobile applications.

16. The method of claim 1, wherein the requests are low priority or non-time critical requests from the mobile applications.

17. A mobile device comprising:
a memory; and
a processor, the mobile device configured for:
extending tolerance of mobile applications on a mobile device from an initial timeout period to delay in establishing a connection to a wireless network, wherein extending the tolerance of the mobile applications to delay includes modifying one or more system functions, wherein the system function includes an ability to access the wireless network for the mobile applications; and
wherein the mobile device is further configured to determine by the processor:
a first tolerance based on receipt of a message over a wireless radio directed to one of the applications;
a second tolerance based on detection of a screen on the mobile device being turned on; and
a third tolerance that is a predetermined value;
and wherein the mobile device is configured, by the processor, to select a shorter of the first, second, and third tolerances;
based on the tolerance that is extended, aggregating, by the processor, over a period of time, requests from the mobile applications such that transfer of the requests during the period of time is delayed,
wherein the tolerance that is extended includes:
the first tolerance when the first tolerance is shorter than the second tolerance and the third tolerance;

the second tolerance when the second tolerance is shorter than the first tolerance and the third tolerance; or the third tolerance when the third tolerance is shorter than the first tolerance and the second tolerance, determining, by the processor, connection timeouts to extend the tolerance of the mobile applications to delay.

18. The mobile device of claim 17, wherein the transfer of the requests during the period of time is delayed without the applications being aware.

19. The mobile device of claim 17, wherein extending the tolerance of the mobile applications to delay further comprises increasing connection timeouts associated with system timers on which the mobile applications rely when establishing a connection to the wireless network.

20. The mobile device of claim 19, wherein the system timers include protocol-specific timers or network stack timers.

21. The mobile device of claim 20, wherein the connection timeouts associated with the protocol-specific timers are modified by a framework wrapper in the mobile device.

22. The mobile device of claim 20, wherein the protocol-specific timers are associated with a protocol over which the mobile applications communicate.

23. The mobile device of claim 22, wherein the protocol includes Hyper Text Transfer Protocol (HTTP), Hyper Text Transfer Protocol Secure (HTTPS) or Extensible Messaging and Presence Protocol (XMPP).

24. The mobile device of claim 17, wherein the period of time over which the requests are aggregated is variable.

25. The mobile device of claim 17, wherein the period of time over which the requests are aggregated is one of: a maximum period of time defined by a gating parameter or the maximum period of time adjusted by an occurrence of an event that causes a radio on the mobile device to turn on or change from low power mode to high power mode.

26. The mobile device of claim 17, wherein the period of time is dynamically determined based on a policy.

27. The mobile device of claim 17, wherein the mobile device is further configured for:

responsive to establishment of a connection to the wireless network at the end of the period of time, transferring the requests aggregated over the period of time over the wireless network to respective servers to which the requests are directed.

28. The mobile device of claim 27, wherein the mobile device is further configured for:

receiving responses to at least some of the requests from respective servers;

providing the responses to respective mobile applications, such that time elapsed between issuing of the requests and receiving of the responses is within the tolerance of the mobile applications to delay that is extended.

29. The mobile device of claim 17, wherein a local proxy on the mobile device aggregates the requests from the mobile applications over the period of time.

30. The mobile device of claim 17, wherein a local proxy on the mobile device provides connection timeouts to the mobile applications to extend the tolerance of the mobile applications to delay.

31. The mobile device of claim 17, wherein the requests are non-user interactive traffic from the mobile applications.

32. The mobile device of claim 17, wherein the requests are low priority or non-time critical requests from the mobile applications.

33. The method of claim 1, wherein the tolerance is determined on an application by application basis.

34. The method of claim 1, wherein a radio of the mobile device is powered off in response to a screen of the mobile device being off.

35. The method of claim 1, wherein the batched requests are transmitted based on a sensed motion of the mobile device.

36. The method of claim 1, wherein the batched requests are transmitted based on a battery status of the mobile device.

37. The method of claim 1, wherein the tolerance is further based on a background status of an application of the mobile applications.

* * * * *